US009084708B2

(12) United States Patent
Horvath et al.

(10) Patent No.: US 9,084,708 B2
(45) Date of Patent: Jul. 21, 2015

(54) MODULAR CHAIR

(75) Inventors: Dylan Horvath, Toronto (CA); Scott Bodaly, Toronto (CA); Travis Patrick Clarke, Kitchener (CA); Takuro Nishiwaki, Waterloo (CA); Greg Hall, Guelph (CA)

(73) Assignee: Broda Enterprises Inc., Ontario (CA)

( * ) Notice: Subject to any disclaimer, the term of this patent is extended or adjusted under 35 U.S.C. 154(b) by 912 days.

(21) Appl. No.: 13/301,046

(22) Filed: Nov. 21, 2011

(65) Prior Publication Data

US 2012/0146301 A1 Jun. 14, 2012

Related U.S. Application Data

(60) Provisional application No. 61/420,888, filed on Dec. 8, 2010.

(51) Int. Cl.

| | |
|---|---|
| ***B62B 1/00*** | (2006.01) |
| ***A61G 5/10*** | (2006.01) |
| ***A61G 5/14*** | (2006.01) |

(52) U.S. Cl.

CPC ............ *A61G 5/1067* (2013.01); *A61G 5/1059* (2013.01); *A61G 5/1075* (2013.01); *A61G 5/14* (2013.01)

(58) Field of Classification Search

CPC ........................................................ B62B 1/00
USPC ...................... 280/47.38, 639–644, 648–649, 280/650–658; 297/195.13, 218.1, 218.2, 297/218.3, 219.12, 440.11
See application file for complete search history.

(56) References Cited

U.S. PATENT DOCUMENTS

| | | | |
|---|---|---|---|
| 2,690,788 | A | 1/1945 | Ames |
| 4,176,879 | A | 12/1979 | Roadaway |
| 4,320,818 | A | 3/1982 | Knoche |
| 4,438,973 | A | 3/1984 | La Pointe |
| D279,240 | S | 6/1985 | Jernigan |
| 4,623,043 | A | 11/1986 | Babilas |
| D289,507 | S | 4/1987 | Danielsson |
| 4,730,842 | A | 3/1988 | Summers et al. |
| 4,741,547 | A | 5/1988 | Tholkes |
| 4,790,553 | A | 12/1988 | Okamoto |
| 4,790,598 | A | 12/1988 | Locher |
| 4,826,196 | A | 5/1989 | Kirkpatrick et al. |
| 4,934,725 | A | 6/1990 | Owens |
| 4,988,114 | A | 1/1991 | Thornton, Jr. |

(Continued)

FOREIGN PATENT DOCUMENTS

| | | |
|---|---|---|
| GB | 2369566 | 6/2002 |

OTHER PUBLICATIONS

Product Brochure for Invaacare Uni-Recliners; obtained Nov. 2010.

(Continued)

*Primary Examiner* — John Walters
*Assistant Examiner* — James Triggs
(74) *Attorney, Agent, or Firm* — Thorpe North & Western, LLP

(57) ABSTRACT

A wheel chair is configurable as a mobility and a positioning chair. The chair has a seat and backrest with opposite side rails to interchangeably receive various components. The seat has a taut sheet of plastic to reduce pressure points. The seat and backrest can tilt together with respect to a base frame. The backrest can recline with respect to the seat.

21 Claims, 22 Drawing Sheets

(56) References Cited

U.S. PATENT DOCUMENTS

| | | | | | |
|---|---|---|---|---|---|
| D315,123 | S | | 3/1991 | Spiegel et al. | |
| 5,020,816 | A | | 6/1991 | Mulholland | |
| 5,033,793 | A | | 7/1991 | Quintile | |
| 5,203,433 | A | | 4/1993 | Dugas | |
| 5,240,277 | A | | 8/1993 | Scheulderman | |
| 5,259,664 | A | | 11/1993 | Cottle | |
| 5,328,183 | A | | 7/1994 | Counts | |
| 5,328,247 | A | | 7/1994 | Lovins | |
| 5,348,367 | A | | 9/1994 | Mizelle | |
| 5,352,020 | A | | 10/1994 | Wade et al. | |
| 5,380,034 | A | * | 1/1995 | Wilson | 280/657 |
| 5,401,045 | A | | 3/1995 | Foerster et al. | |
| D364,971 | S | | 12/1995 | Sterlacci | |
| D374,129 | S | | 10/1996 | Timmons | |
| 5,560,627 | A | | 10/1996 | Zatulovsky et al. | |
| D390,368 | S | | 2/1998 | Tseng | |
| 5,868,461 | A | * | 2/1999 | Brotherston | 297/84 |
| D414,143 | S | | 9/1999 | Brotherston | |
| 5,947,557 | A | | 9/1999 | Bellefleur | |
| 6,120,094 | A | | 9/2000 | Parent | |
| 6,155,586 | A | | 12/2000 | Melgarejo et al. | |
| 6,206,405 | B1 | | 3/2001 | Watkins | |
| 6,217,050 | B1 | | 4/2001 | Dickie et al. | |
| 6,234,576 | B1 | | 5/2001 | Fleigle | |
| 6,244,658 | B1 | | 6/2001 | Parent et al. | |
| D455,985 | S | | 4/2002 | Olivares | |
| 6,406,095 | B1 | | 6/2002 | Bouchard et al. | |
| D462,845 | S | | 9/2002 | Canto Garcia | |
| 6,464,295 | B1 | | 10/2002 | Bergeron et al. | |
| 6,499,756 | B2 | | 12/2002 | Amirola | |
| 6,517,160 | B2 | | 2/2003 | Marcantoni | |
| 6,585,279 | B1 | | 7/2003 | Galloway et al. | |
| 6,588,841 | B1 | | 7/2003 | Hoffman et al. | |
| 6,612,651 | B1 | | 9/2003 | Harland | |
| 6,648,354 | B2 | | 11/2003 | James | |
| D484,832 | S | | 1/2004 | Okamoto et al. | |
| 6,715,784 | B2 | | 4/2004 | Koerlin et al. | |
| 6,761,405 | B2 | | 7/2004 | Bellefleur | |
| 6,764,137 | B2 | | 7/2004 | Menard | |
| 6,773,073 | B1 | | 8/2004 | Escobedo | |
| 6,880,845 | B1 | | 4/2005 | Broyles et al. | |
| 6,913,318 | B2 | | 7/2005 | Higley et al. | |
| 6,997,510 | B2 | | 2/2006 | Guillot et al. | |
| 7,011,362 | B1 | * | 3/2006 | Huang | 297/89 |
| 7,201,438 | B2 | | 4/2007 | Reinsch et al. | |
| 7,334,840 | B2 | | 2/2008 | Deans et al. | |
| 7,360,840 | B2 | | 4/2008 | Barlow et al. | |
| 7,360,841 | B2 | | 4/2008 | Barlow et al. | |
| 7,503,624 | B2 | | 3/2009 | Hoffman et al. | |
| 7,540,520 | B2 | | 6/2009 | Barlow et al. | |
| D606,909 | S | | 12/2009 | Ahlbertz | |
| 7,661,696 | B1 | | 2/2010 | Acebo | |
| D611,718 | S | | 3/2010 | Tierney | |
| D653,591 | S | | 2/2012 | Horvath et al. | |
| 2006/0181068 | A1 | | 8/2006 | Bennett et al. | |
| 2008/0258512 | A1 | | 10/2008 | Rogers | |
| 2009/0315376 | A1 | | 12/2009 | Nishiwaki | |

OTHER PUBLICATIONS

Product Brocure for Optimum Posturo-Pedic Chari, Series 1000; obtained Nov. 2010.

Product Brochure for Comp-Position-Tilt—In-Space; obtained Nov. 2010.

Product Users Guide for com-Position; obtained Nov. 2010.

Product Brochure for Dyn-Ergo Scoot Chair; obtained Nov. 2010.

Product Users Guide for Dyn-Ergo; Obtained Nov. 2010.

Product Brochure for Maple Leaf Wheelchair, MLT 700A and 700B; obtained Nov. 2010.

Product Brochure for Optimum Posturo-Pedic Chair; obtained Nov. 2010.

Product Operating and Maintenance Manual for Maple Leaf Wheelchair; obtained Nov. 2010.

Broda Product Brochure; 587 Tilt Wheelchair; obtained Oct. 2004.

Broda Product Brochure; Vanguard Bariatric Tilt Recliner; obtained May 2010.

Broda Product Brochure; Comfort Tension Seating, Long Term Chair; 4 pages.

Broda Product Brochure; Auto Locking Glider; Obtained Apr. 2006.

Broda Product Brochure; Model CS385 Commode Shower Chair.

Broda Product Brochure; Pedal Rocker; obtained Oct. 2000.

Broda Product Brochure; Pedal Chair; obtained 1988.

Broda Product Brochure; Midline Full Recliner; obtained May 2006.

Broda Product Brochre; Elite Chairs.

Broda Product Brochure; Acute Care Chair.

Broda Product Brochure; Bari 385; Bariatric Transport Commode-Shower Chair; obtained Feb. 2006.

Broda Product Brochure; 30VT and 80V Models; Basic Chairs; obtained 1993.

Broda Product Brochure; Seating Solutions.

Broda Essentials for Seating and Positioning.

* cited by examiner

Fig. 1g
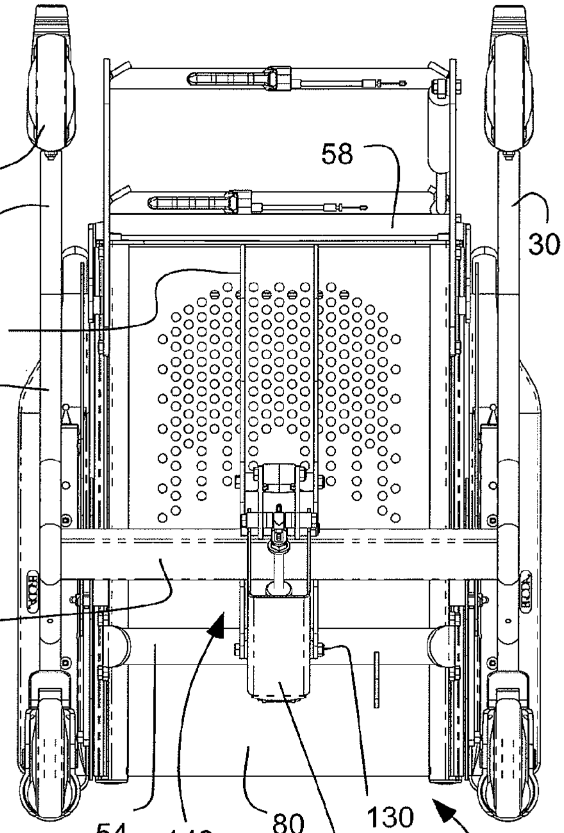
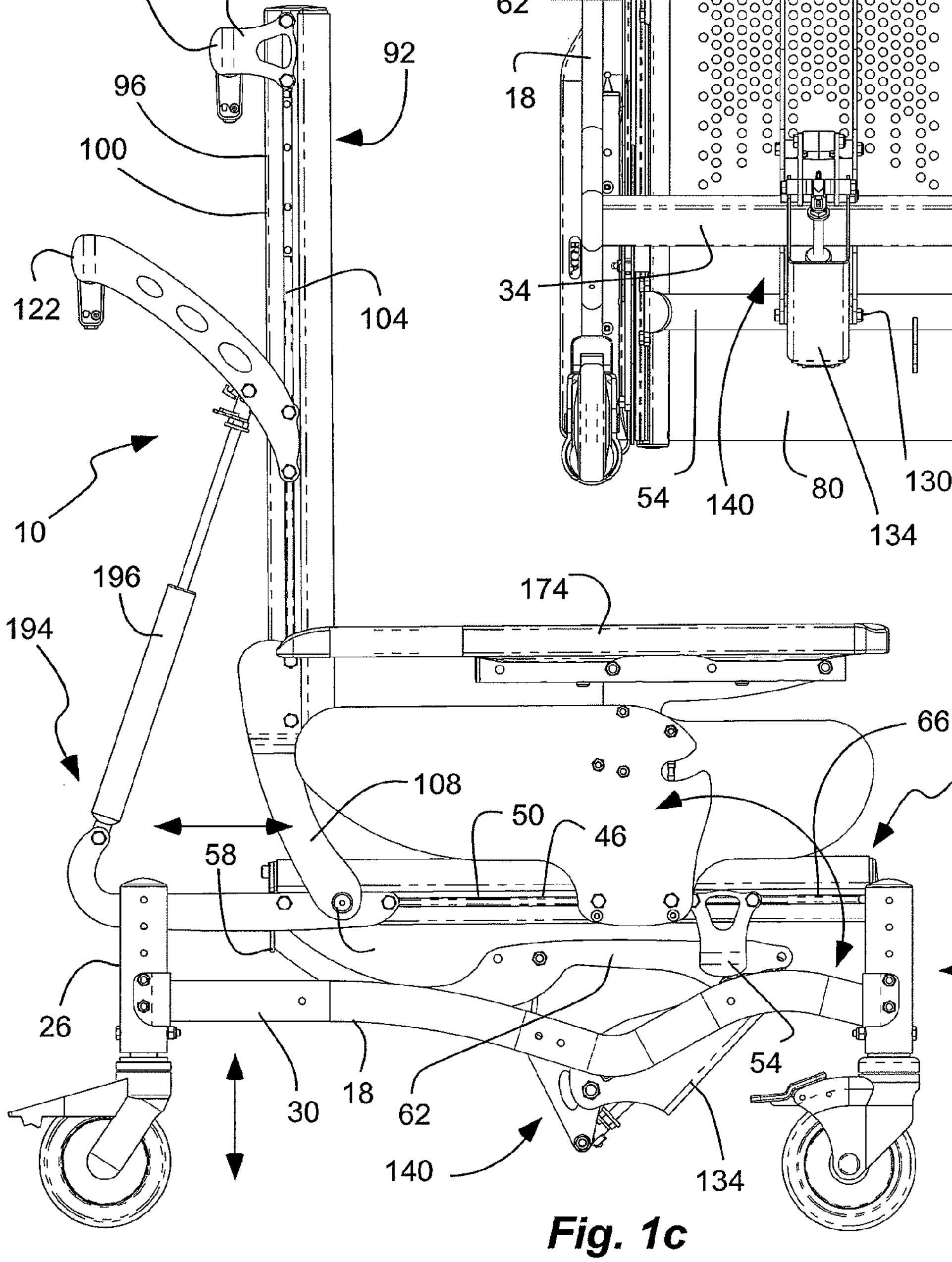
Fig. 1c

*Fig. 10a*
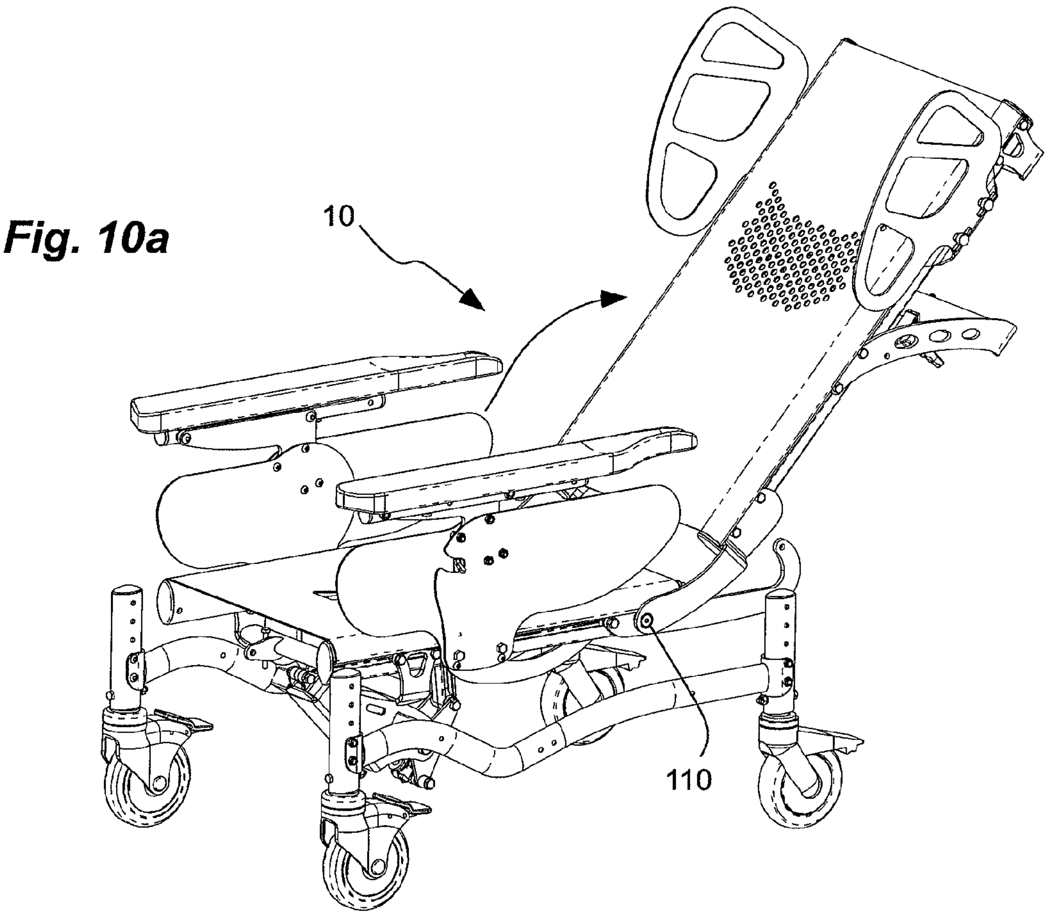
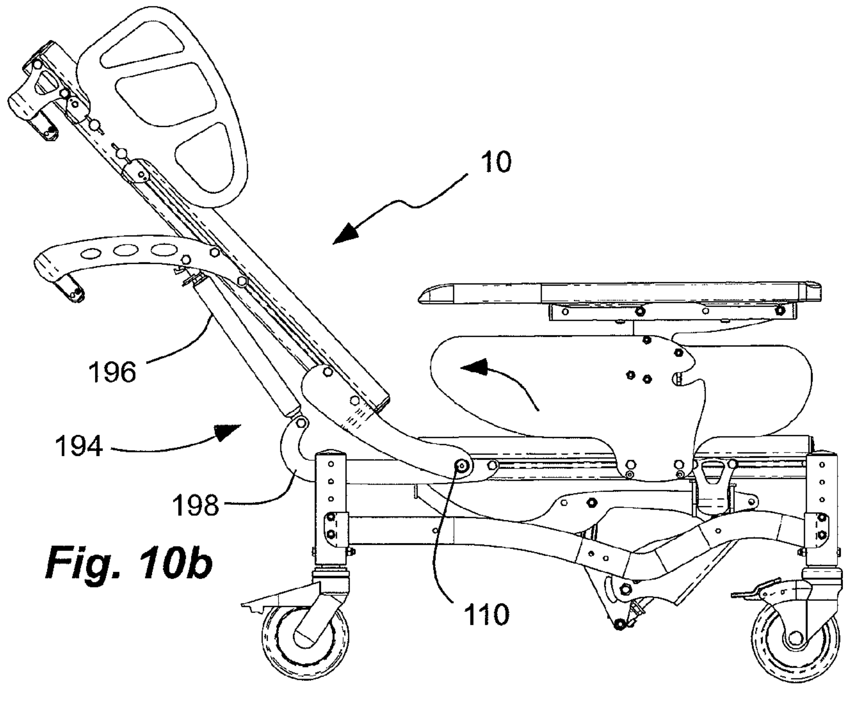
*Fig. 10b*

MODULAR CHAIR

CROSS-REFERENCE TO RELATED APPLICATIONS AND CLAIM OF PRIORITY

Priority of U.S. Provisional Patent Application Ser. No. 61/420,888, filed on Dec. 8, 2010, is claimed; and is herein incorporated by reference.

This is related to U.S. patent application Ser. No. 29/380,585, filed Dec. 8, 2010; which is herein incorporated by reference.

BACKGROUND

1. Field of the Invention

The present invention relates generally to wheel chairs or mobility chairs, and positioning chairs.

2. Related Art

Elderly or infirm patients or residents of assisted living facilities often utilize wheeled chairs. There are typically two types of chairs, namely mobility chairs and positioning chairs. Mobility chairs provide support and independent mobility for patients or residents capable of self propulsion. Positioning chairs provide positioning for extended periods of sitting. Mobility chairs typically have a lower seating surface to enable the patient's or resident's feet to reach the floor to propel the chair. Mobility chairs often provide an unobstructed area in front of and below the seat to accommodate leg movement. Positioning chairs typically have a higher seating surface to accommodate tilting of the seating surface. Positioning chairs often include a leg rest or support. A patient or resident often progresses or migrates from a mobility chair to a positioning chair as health or ability deteriorates. It will be appreciated that providing both a mobility chair and then a positioning chair can be an added expense for a family or other health care provider.

A consideration in both mobility and positioning chairs is comfort or the reduction of pressure points. It will be appreciated that pressure points or concentrations over extended periods of sitting can not only be uncomfortable, but can lead to additional health issues. Thus, such chairs often include a padded surface of foam. Another concept for the reduction of pressure points is the use of a series of discrete straps spanning a width of the seat and backrest. For example, see Broda Comfort Tension Seating™ by Broda Seating; U.S. Pat. No. 5,868,461 and D414,143; and US Patent Publication No. 2009-0315376.

SUMMARY OF THE INVENTION

It has been recognized that it would be advantageous to develop a modular chair that is capable of converting between both a mobility chair and a positioning chair. In addition, it has been recognized that it would be advantageous to develop a mobility or positioning chair, or both, that tilts, reclines, raises and has variable depth. In addition, it has been recognized that it would be advantageous to develop a mobility or positioning chair, or both, that can receive accessories. In addition, it has been recognized that it would be advantageous to develop a mobility or positioning chair, or both, that reduces pressure points.

The invention provides a mobility or positioning chair device or both for patients or residents. The chair device includes a wheel base with a base frame intercoupling a plurality of casters. A seat is coupled to the base frame and has a seat frame with a pair of seat rails including left and right side seat rails extending longitudinally on respective left and right sides of the seat and coupled to one another in a spaced-apart relationship by at least one seat cross-bar. The seat rails have longitudinally oriented elongated channels. A sheet of flexible and resilient plastic is carried by the seat frame and held taut between the pair of seat rails with lateral ends of the sheet of plastic retained in the channels of the pair of seat rails. The sheet of plastic extends a longitudinal depth of the seat from a forward end of the pair of seat rails to a rearward end of the pair of seat rails. A backrest is coupled to the seat and has a backrest frame with a pair of backrest rails including left and right side backrest rails on respective sides of the backrest and coupled to one another in a spaced-apart relationship by at least one backrest cross-bar. The backrest rails have longitudinally oriented elongated channels. A sheet of flexible and resilient plastic is carried by the backrest frame and held taut between the pair of backrest rails with lateral ends of the sheet of plastic retained in the channels of the pair of backrest rails. The sheet of plastic extends a height of the backrest from a lower end of the pair of backrest rails to an upper end of the pair of backrest rails.

In addition, the invention provides a combined mobility and positioning chair device for periods of extended sitting and self-propelled independent mobility for patients or residents. The chair device includes a wheel base with a base frame intercoupling a plurality of casters. The chair device also includes a first plurality of shorter caster posts with the base frame selectively coupled to the first plurality of shorter caster posts to elevate a seating surface within an elevational height range from 13 to 17 inches. In addition, the chair device also includes a second plurality of taller caster posts, interchangeable with the first plurality of shorter caster posts, with the base frame selectively coupled to the second plurality of taller caster posts to elevate the seating surface within an elevational height range from 18 to 21 inches. A seat is coupled to the base frame and has a seat frame with a pair of seat rails including left and right side seat rails extending longitudinally on respective left and right sides of the seat and coupled to one another in a spaced-apart relationship by at least one seat cross-bar. The seat rails have T-slots formed by longitudinally oriented elongated grooves with enlarged cavities and reduced openings into the cavities. The seat has the seating surface. A backrest is coupled to the seat utilizing the T-slots of the pair of seat rails of the seat frame, and has a backrest frame with a pair of backrest rails including left and right side backrest rails on respective sides of the backrest and coupled to one another in a spaced-apart relationship by at least one backrest cross-bar. The backrest rails have T-slots formed by longitudinally oriented elongated grooves with enlarged cavities and reduced openings into the cavities. A pair of brackets is coupled between the seat and the backrest and attaches the backrest frame to the seat frame. The pair of brackets is coupled to the T-slots of the backrest rails and the seat rails. The pair of brackets is selectively locatable in the T-slots of the seat rails to selectively locate the backrest with respect to the seat and selectively set a depth of the seat. The seat is pivotally coupled to the base frame at a pivot coupling located closer to a front of the seat and a front of the wheel base so that the seat and backrest tilt together with respect to the base frame. A leg rest is selectively coupleable to the seat.

Furthermore the invention provides a mobility or positioning chair device or both for patients or residents. The chair device includes a wheel base with a base frame intercoupling a plurality of casters. A seat is coupled to the base frame and has a seat frame with a pair of seat rails including left and right side seat rails extending longitudinally on respective left and right sides of the seat and coupled to one another in a spaced-apart relationship by at least one seat cross-bar. The seat rails have T-slots formed by longitudinally oriented elongated grooves with enlarged cavities and reduced openings into the cavities. A backrest is coupled to the seat utilizing the T-slots of the pair of seat rails of the seat frame and has a backrest frame with a pair of backrest rails including left and right side backrest rails on respective sides of the backrest and coupled to one another in a spaced-apart relationship by at least one backrest cross-bar. The backrest rails have T-slots formed by longitudinally oriented elongated grooves with enlarged cavities and reduced openings into the cavities.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 1*c* is a side view of the chair of FIG. 1*a;*

FIG. 1*g* is a bottom view of the chair of FIG. 1*a;*

FIG. 10*a* is perspective view of the chair of FIG. 1*a* shown in the mobility configuration and in a fully reclined configuration with the recline mechanism;

FIG. 10*b* is a side view of the chair of FIG. 1*a* shown in the mobility configuration and in the fully reclined configuration with the recline mechanism;

Figure 1A:
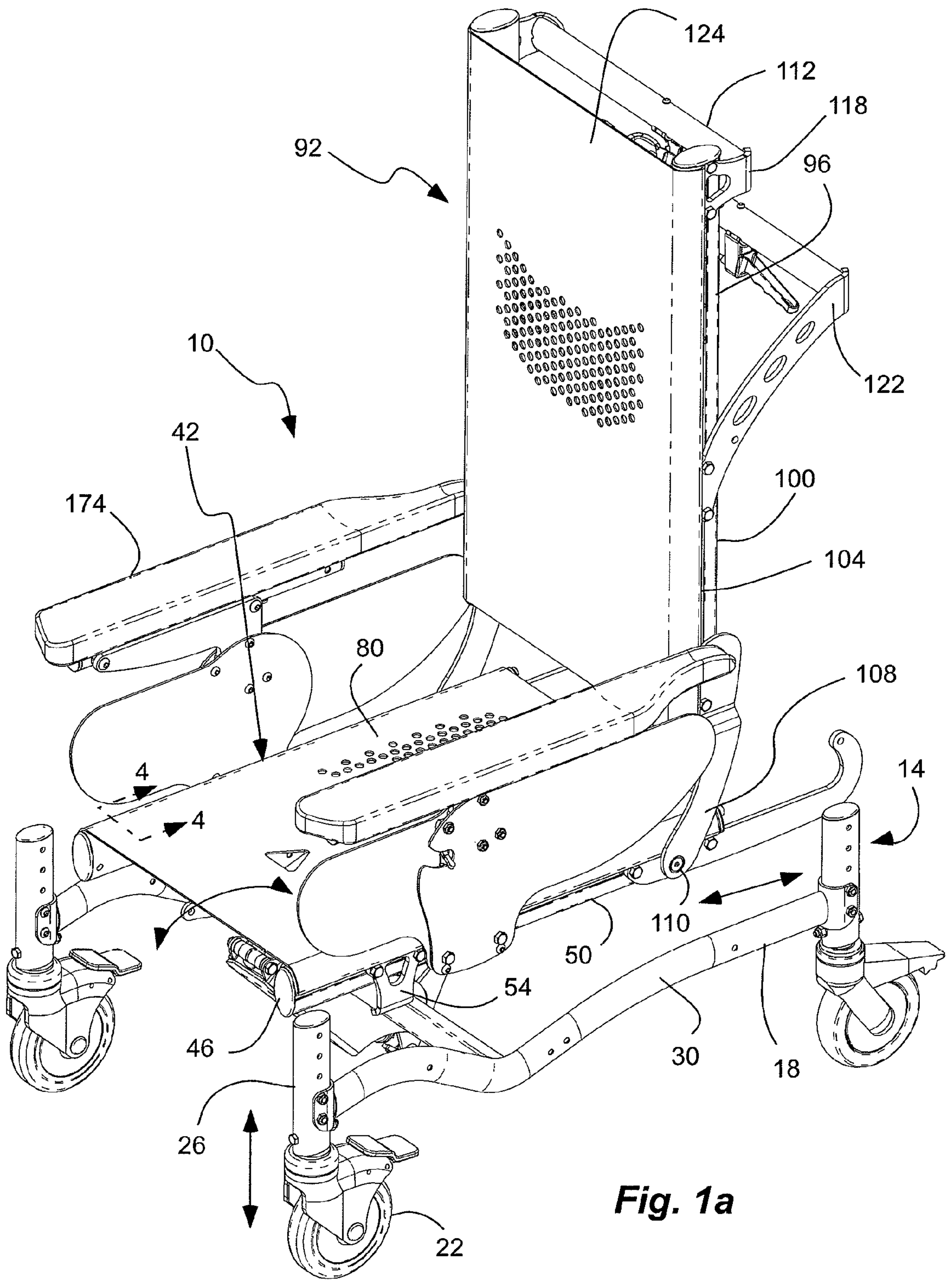
FIG. 1*a* is a front perspective view of a chair in accordance with an embodiment of the present invention shown in a mobility configuration and in an upright configuration and with a recline mechanism.
Figure 1B:
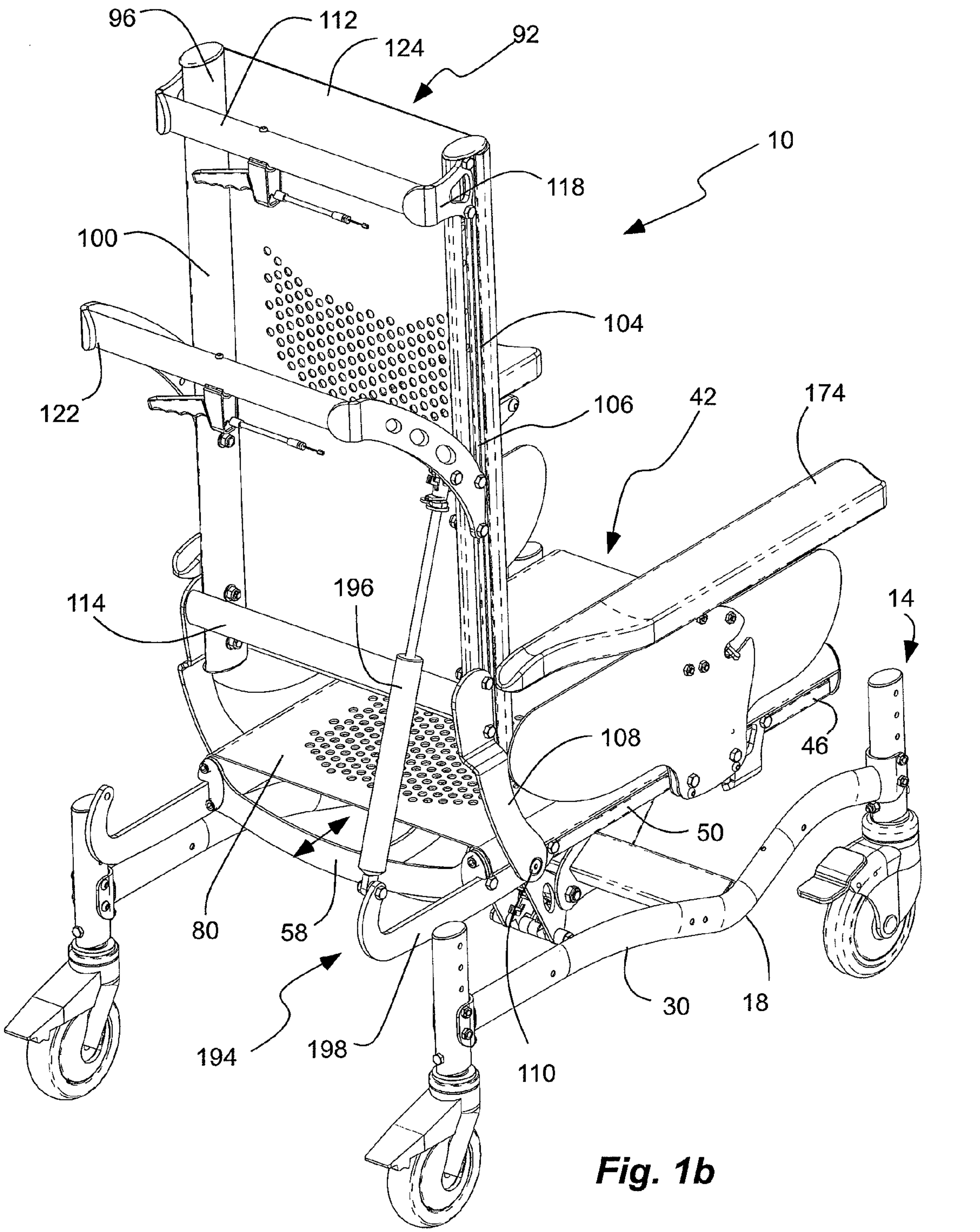
FIG. 1*b* is a rear perspective view of the chair of FIG. 1*a;*
Figure 1E:
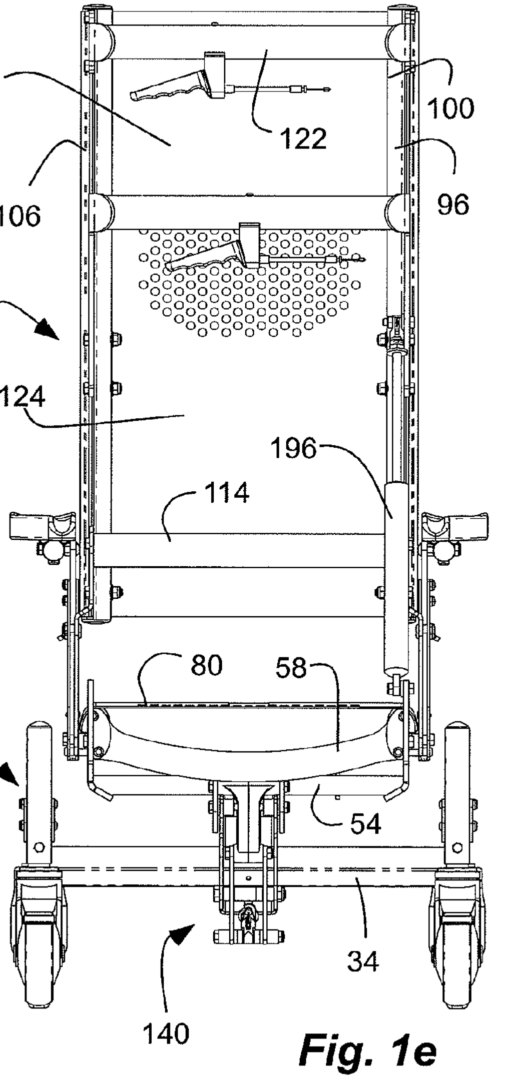
FIG. 1*e* is a back view of the chair of FIG. 1*a;*
Figure 1D:
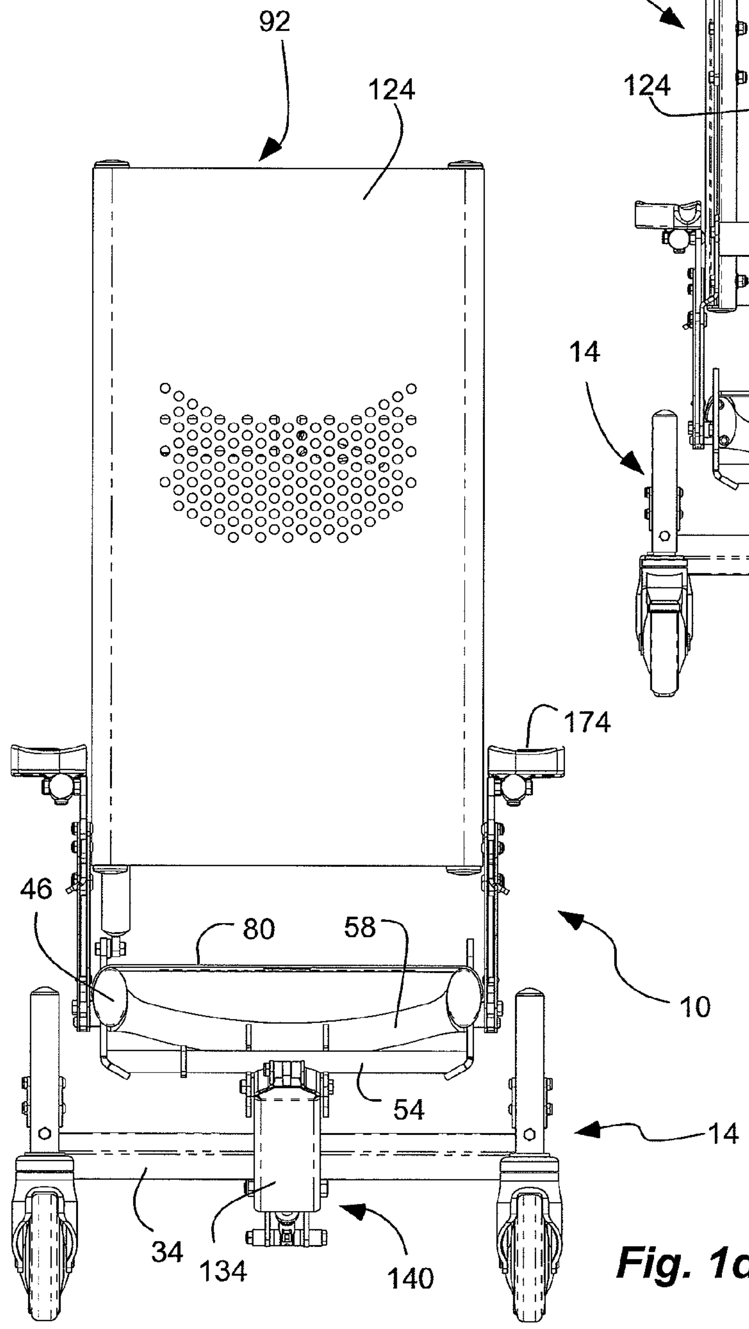
FIG. 1*d* is a front view of the chair of FIG. 1*a;*
Figure 1F:
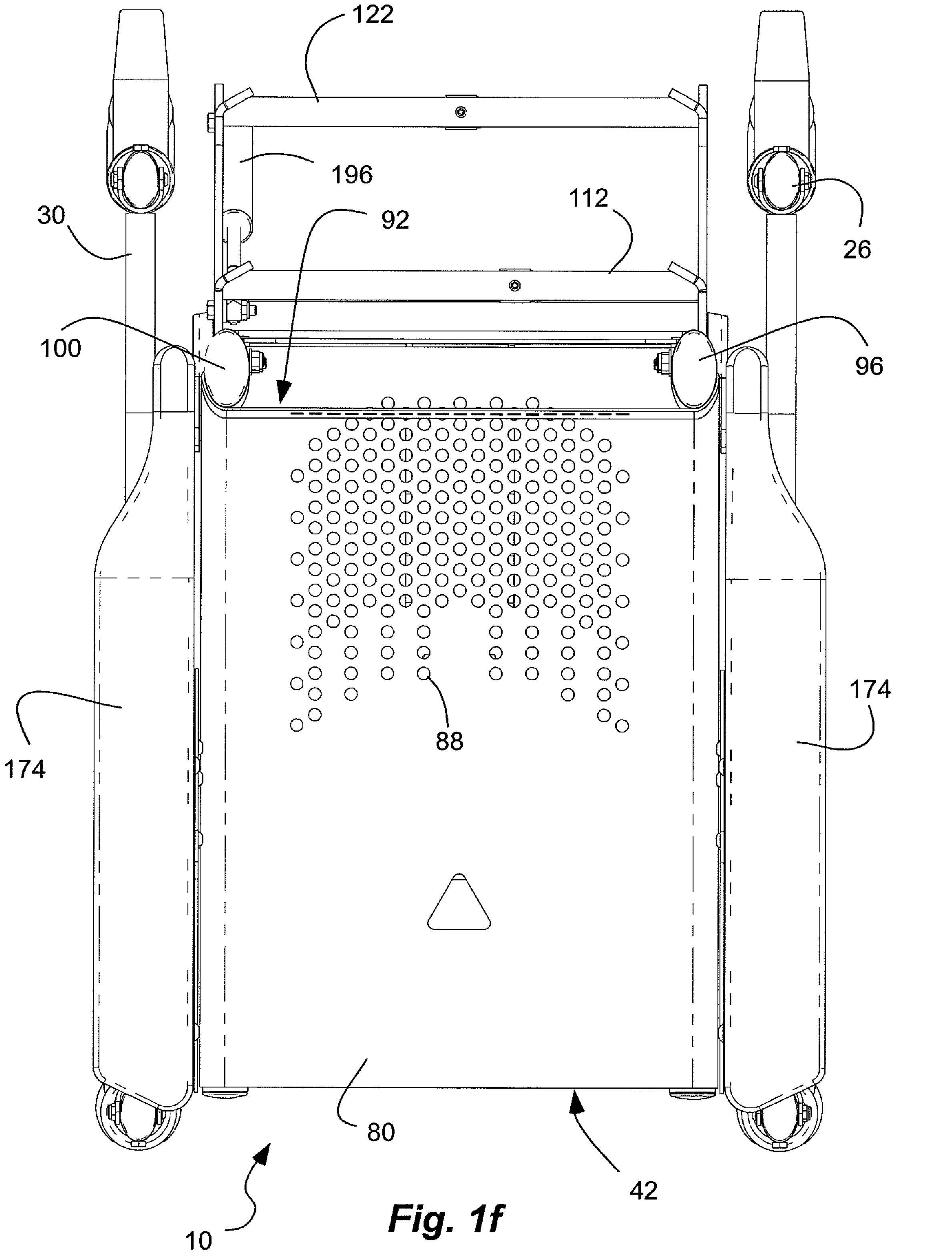
FIG. 1*f* is a top view of the chair of FIG. 1*a;*
Figure 2:
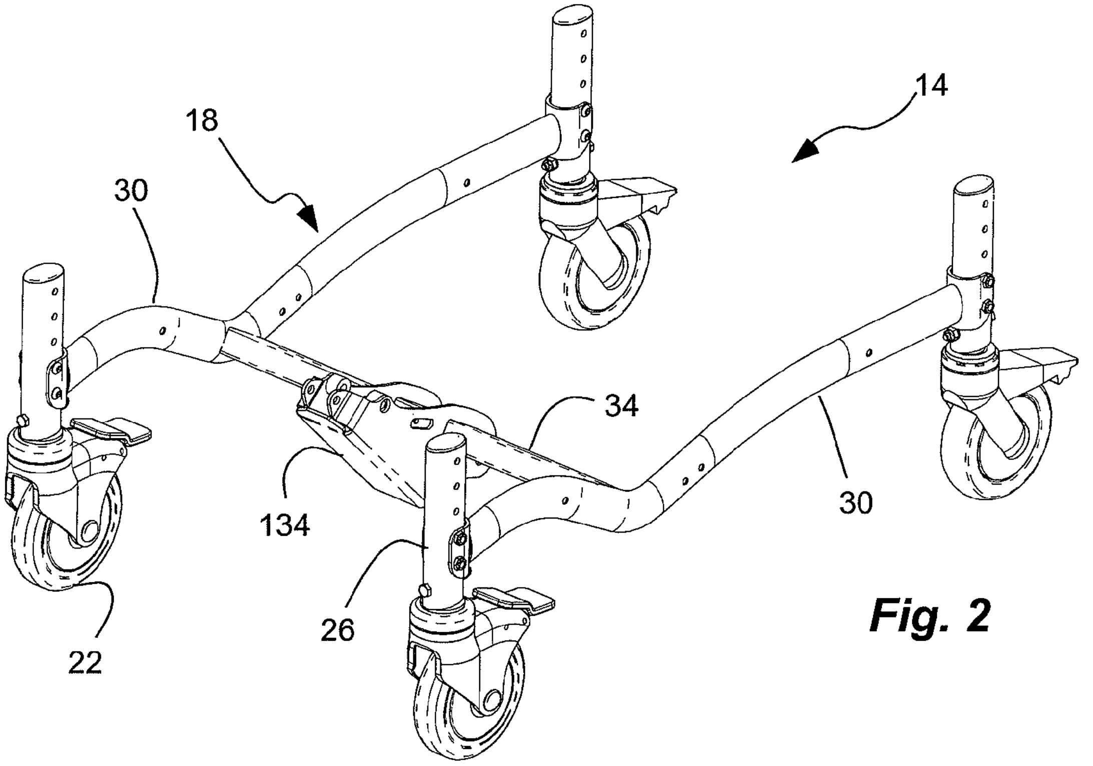
FIG. 2 is a perspective view of a wheel base of the chair of FIG. 1*a;*

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The term "mobility" is used herein to refer to a configuration of the chair primarily for patients or residents who are ambulatory and capable of self propulsion using their legs by sitting in the chair with their feet contacting the floor. The seating surface of the seat or chair can have an elevational height of between 13 to 17 inches with respect to the floor. In addition, the seat can be elevated with the taller caster posts so that the seat or chair can have an elevational height of between 18 to 21 inches with respect to the floor. Furthermore, the seat or seating surface can be tilted between horizontal and inclined, such as up to 32 degrees with respect to horizontal. The backrest can be fixed with respect to the seat, or can be reclineable.

The term "positioning" is used herein to refer to a configuration of the chair primarily for extended periods of sitting of a non-ambulatory patient or resident. The seat can be elevated with the taller caster posts so that the seat or chair can have an elevational height of between 18 to 21 inches with respect to the floor. In addition, the seat or seating surface can be tilted between horizontal and inclined, such as up to 32 degrees with respect to horizontal. The backrest can be reclineable with respect to the seat, and can recline from 0 degrees through up to 45 degrees. Furthermore, various accessories can be associated with the chair, including a footrest or legrest, wings, neck rest, terrycloth pads, shoulder bolster, side panels, IV pole, oxygen tank holder, etc.

The terms "casters" and "wheels" are used interchangeably herein. Casters can be a type of pivotal wheel pivotal about a vertical axis in a horizontal plane, with the rotational axis of the caster off-set with respect to the vertical pivot axis. The wheels can include so called mag wheels.

The term "tilt" is used herein to refer to the pivoting of the seat, or seat and backrest, with respect to horizontal.

The term "recline" is used herein to refer to the pivoting of the backrest with respect to the seat.

The term "longitudinal" is used herein to refer to a front-to-back direction of the chair.

The terms "single sheet of flexible and resilient plastic" and "sheet of flexible and resilient plastic" and "sheet of plastic" are used interchangeably herein to refer to a sheet of plastic, such as TPU, that is single in the sense that extends the depth or substantially the depth of the seat (or the height or substantially the height of the backrest) and extends the lateral width of the sear and/or backrest, as opposed to several spaced-apart straps, although the sheet can include one or more layers; that is continuous in the sense that it is a single sheet extending laterally and longitudinally (depth) and elevationally, as opposed to several spaced-apart straps, although the sheet can include apertures therein; and that is flexible and resilient, and elastic, in that it is flexible to deform under an applied force, such as weight, and resilient to return to its original configuration, or substantially its original configuration, upon removal of the applied force.

The term "seating surface" refers to an uppermost surface of the seat upon which the user sits, and can be the uppermost surface of the sheet of plastic, or the uppermost surface of a pad disposed on the sheet of plastic, or the uppermost surface of a cover on the sheet or plastic or pad thereon.

The terms "ground" and "floor" are used interchangeably herein to refer to a support surface upon which the chair is placed.

The terms "elevation" and "elevational height" refer to a vertical distance from the ground or floor.

The terms "patient," "resident" and "user" are used interchangeably herein to refer to the user of the chair disposed on or in the chair. The term "caregiver" is used herein to refer to a user of the chair who positions and/or moves the chair.

DESCRIPTION

As illustrated in FIGS. 1*a*-11*b*, a modular chair or wheel chair, indicated generally at 10, in an example implementation in accordance with the invention is shown. The chair 10 can be a combined mobility and positioning chair, and can be modular to provide multiple configurations, including a mobility configuration for ambulatory patients or residents (as shown in FIG. 1*a*), and a positioning configuration for non-ambulatory patients or residents (as shown in FIG. 9*a*). As described in greater detail below, the chair can be configured to interchangeably receive various components to configure the chair as a mobility chair and a positioning chair. Thus, as a patient or resident progresses, graduates or migrates from a mobility to a positioning chair as his or her condition deteriorates from ambulatory to non-ambulatory, the chair of the present invention can be configured to accommodate those needs, providing both mobility and positioning. In addition, the chair can provide seat tilt, in either or both configurations, of up to 32 degrees with respect to horizontal, and at all elevational heights of the seating surface. In addition, the chair can provide a seat height or seating surface elevational height of between 13-17 inches in the mobility configuration (or even 18-21 inches for taller patients or residents), or of between 18-21 inches in the positioning configuration. In addition, the chair can provide various seat depths, in either or both configurations, between 15 and 21 inches from the leading edge of the seat or seating surface. Furthermore, the chair or seat (and/or backrest) is a pressure redistributing seat that reduces pressure points. The seat and/or backrest can have an average (over time) peak pressure of less than 32 mmHg in one aspect, and less than 29 mmHg in another aspect. In addition, the seat and/or backrest can have an easy clean surface that is bacteria resistant and that is compliant and breathable.

The chair 10 can include a wheel base 14 with a base frame 18 intercoupling a plurality of casters 22 or wheels. The base frame 18 can be vertically moveable with respect to the casters, and can be selectively elevated with respect to the casters. The casters allow the chair to be propelled by a user, the patient or resident, or moved by a caregiver. The chair can include four casters 22 located at opposite corners (front left, front right, back left and back right) of the chair. The casters 22 can be pivotal or can swivel about vertical axes which are off-set with respect to horizontal caster or wheel axes of rotation. One or more of the casters can be selectively lockable to resist or prevent rotation, and thus resist or prevent movement of the chair. The casters 22 can be coupled to the base frame 18 by a plurality of caster posts 26 extending vertically from the plurality of casters. The caster posts 26 can be a first plurality of shorter caster posts. The caster posts can include a plurality of vertically arrayed horizontal holes.

The base frame 18 can include a pair of side arms 30, including a left side arm and a right side arm, extending longitudinally between front and back casters on respective left and right sides. Thus, the left side arm can intercouple or connect the front and back casters on the left side, while the right side are can intercouple or connect the front and back casters on the right side. Opposite ends of the side arms can be coupled to the casters. Yokes or forks can be disposed on the opposite ends of the side arms to engage the caster posts. The yokes or forks can have vertical openings to receive the caster posts and to be selectively vertically positioned along the caster posts. Horizontal holes can be formed in the yokes or forks and aligned with the horizontal holes of the caster posts to receive a pin or detent to selectively secure the side arms with respect to the casters. The side arms 30 can be spaced-apart from one another, and disposed on opposite sides of the chair. In addition, the side arms 30 can be parallel with one another and straight in a vertical plane. Furthermore, the side arms 30 can vary in elevational height along their length between the front and back of the chair so that a single side arm can accommodate other structure components at different elevations. The side arms can have an elliptical cross-section with a major diameter oriented vertically so that a majority of the strength of the side arms is vertically oriented.

A base frame cross-bar 34 can extend between and interconnect or attach the pair of side arms 30. The cross-bar 34 can be located rearward or spaced-apart from the front of the chair at an intermediate location along the side arms to provide a free space under a front of the chair to accommodate the user's legs and feet during propulsion or ambulatory movement. The cross-bar 34 can also be positioned at a lower elevation with respect to the opposite ends or yokes or forks of the side arms to accommodate tilting, as discussed below. Thus, the side arms can vary in elevation as discussed above. The cross-bar can provide the sole support between the side arms. The side arms 30 and the cross-bar 34 can define the base frame 18 and can be formed of tube stock steel or aluminum welded together. As discussed above, the base frame 18 can move vertically with respect to the ground or floor, and the casters, by elevating the base frame 18 along the caster posts 26. The pair of side arms 30 of the base frame can be selectively coupled to the plurality of caster posts 26 along a vertical range to selectively elevate the base frame with respect to the plurality of casters. As described above, the plurality of caster posts can be a first plurality of shorter caster posts with the base frame selectively coupled to the first plurality of shorter caster posts to elevate the seating surface within a range from 13 to 17 inches with respect to the ground or floor. This range should accommodate most users, or the lower leg length of most users.

Figure 8B:
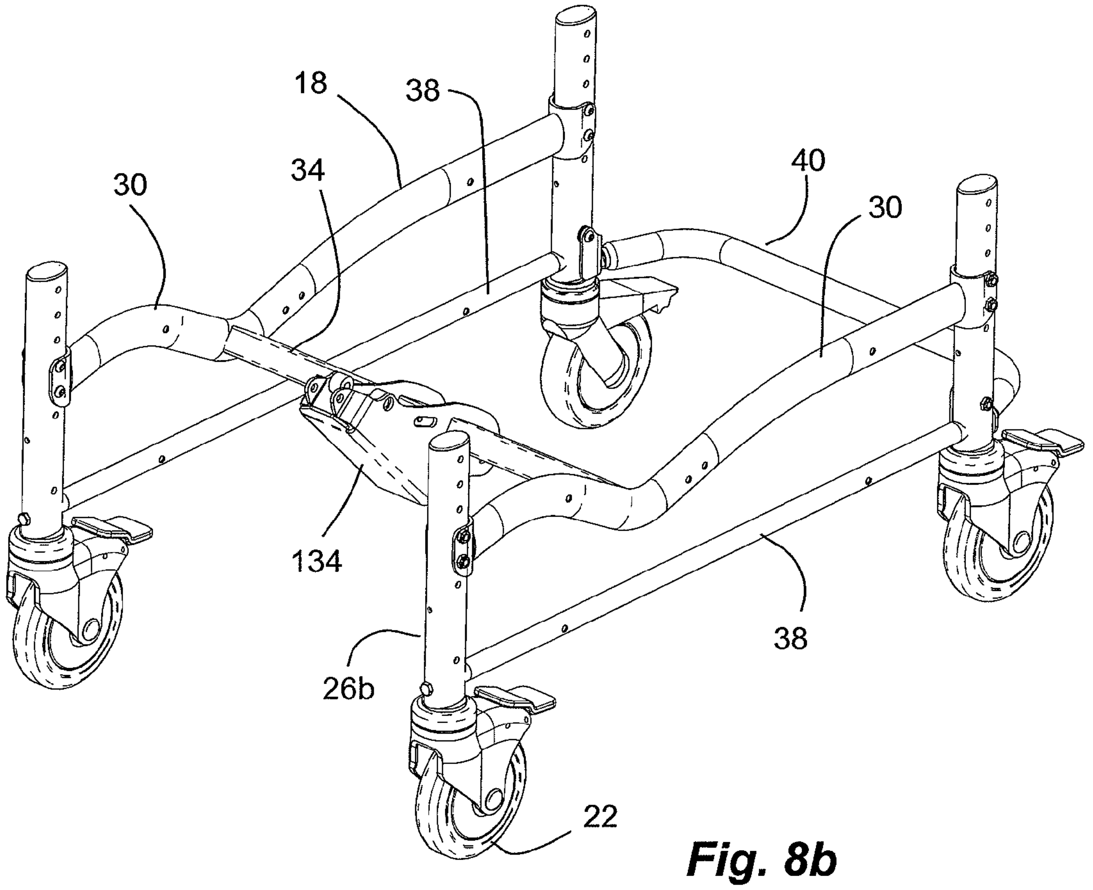
FIG. 8*b* is a perspective view of the wheel base of the chair of FIG. 1*a* shown with taller caster posts.
Figure 9A:
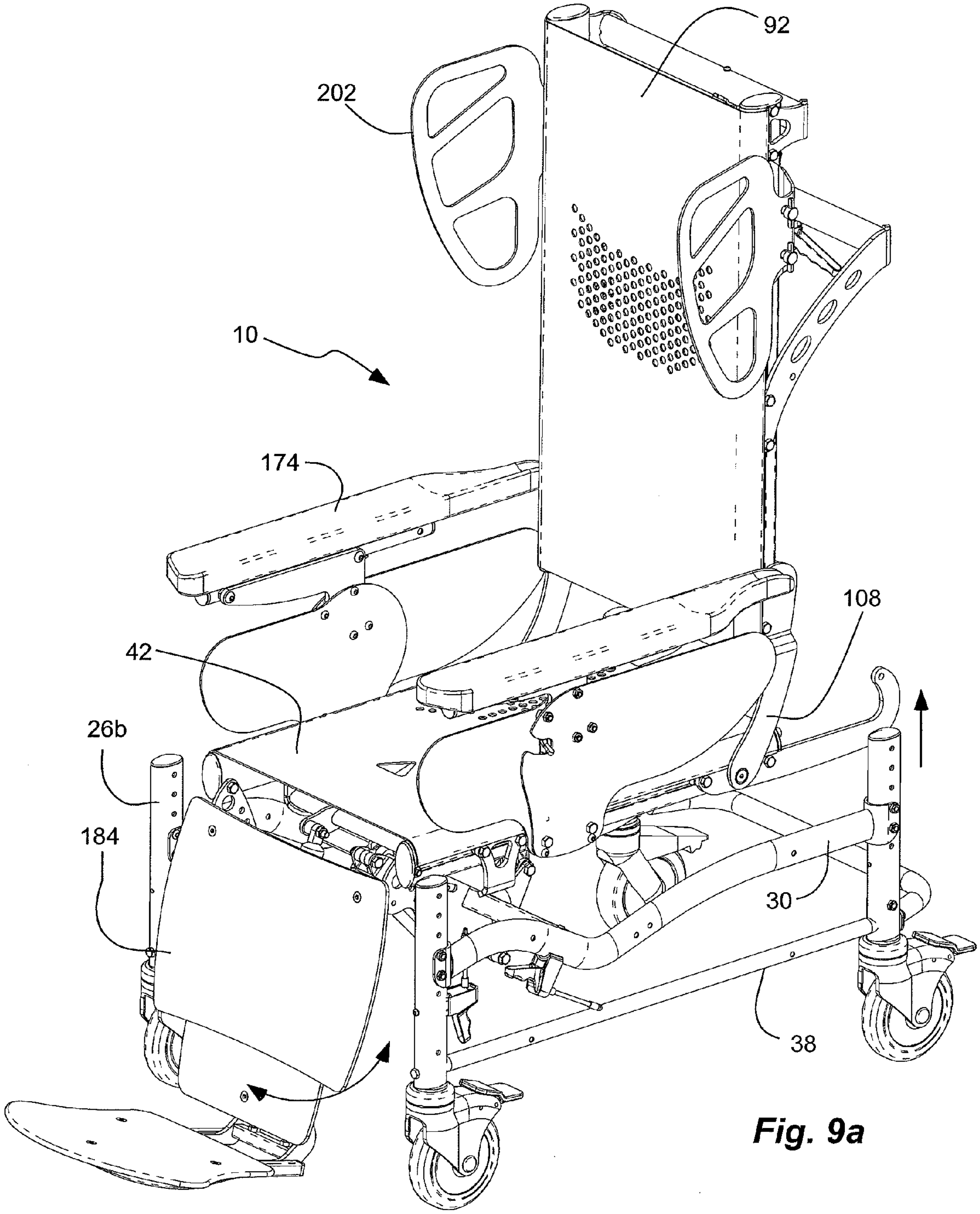
FIG. 9*a* is a perspective view of the chair of FIG. 1*a* shown in a positioning configuration and in the elevated configuration with taller caster posts, the recline mechanism and a foot rest in a lowered configuration.

The chair can have a second plurality of taller caster posts 26*b* interchangeable with the first plurality of shorter caster posts 26, as shown in FIG. 8*b*. The shorter and taller caster posts can be interchanged on the same casters, or each provided with different casters. The base frame 18 can be selectively coupled to the second plurality of taller caster posts 26*b* to elevate the seating surface within a range from 18 to 21 inches. This range can accommodate taller users, or users with longer lower leg lengths. In addition, this range can be used in the positioning configuration of the chair, as discussed in greater detail below. A pair of additional side braces 38 including a left side brace and a right side brace can extend longitudinally between the front and back wheels, or caster posts 26*b*, on respective left and right sides bellow the pair of side arms 30. Thus, the side arms 30 can attach to upper ends of the caster posts 26*b* to provide upper support while the side braces 38 can attached to lower ends of the caster posts 26*b* to provide lower support. In addition, a secondary cross-bar 40 (FIG. 8*b*) can extend between and interconnect or attach the rear taller caster posts 26*b* and/or casters at a rear of the chair to provide additional support.

The chair 10 has a seat 42 coupled to the base frame 18. The seat 42 has a seat frame 46 with a pair of seat rails 50 including left and right spaced-apart side seat rails extending longitudinally on respective left and right sides of the seat. The seat rails 50 are coupled to one another in a spaced-apart relationship by at least one seat cross-bar. A forward seat cross-bar 54 can be coupled to the seat rails 50 nearer a front of the seat or chair, while a rear seat cross-bar 58 can be coupled nearer a rear of the seat or chair. The seat cross-bars can extend laterally. The forward seat cross-bar 54 can be coupled to T-slots of the seat rails, while the rear seat cross-bar 58 can be coupled to open back ends of the seat rails, as discussed in greater detail below. One or more center spar(s) 62 can be coupled between the forward and rear seat cross-bars 54 and 58, and can extending longitudinally. The center spar 62 can include a pair of center spars that are narrowly spaced apart and positioned near a center-line of the seat or chair. The seat 42 or seat frame 46 can be coupled to the base frame 18 by the center spar(s) 62. The forward seat cross-bar 54 can be off-set lower with respect to the seat rails 50. The rear seat cross-bar 58 can be arcuate and concave (facing upwardly). Similarly, the center spar(s) 62 can have an upwardly facing concave indentation. This configuration allows for deflection of the seating surface, as described below. While the forward seat cross-bar 54 can be coupled near a front of the seat or rails, it can also be set back with respect to the front. Thus, the seat has an open front end between forward ends of the pair of seat rails that is free of rigid structure to provide comfort to the user's thighs and to allow for movement of the user's legs for mobility and propulsion.

Figure 3:
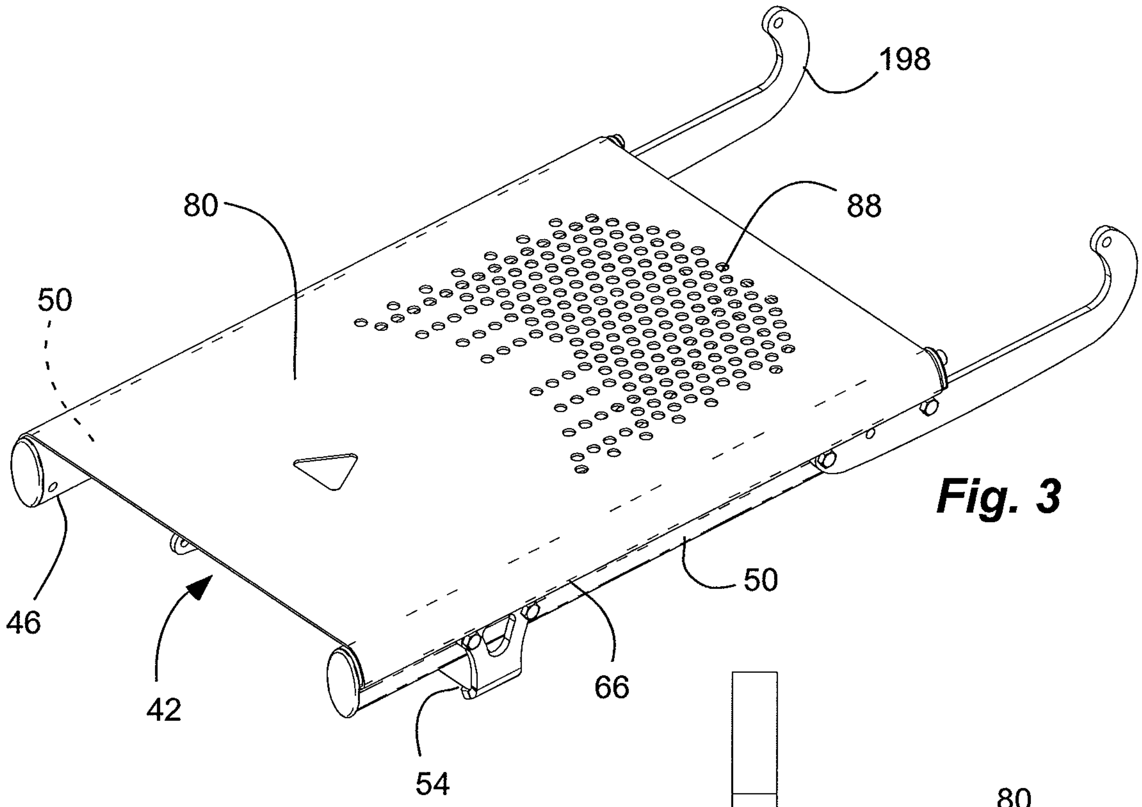
FIG. 3 is a perspective view of a seat of the chair of FIG. 1*a;*
Figure 4:
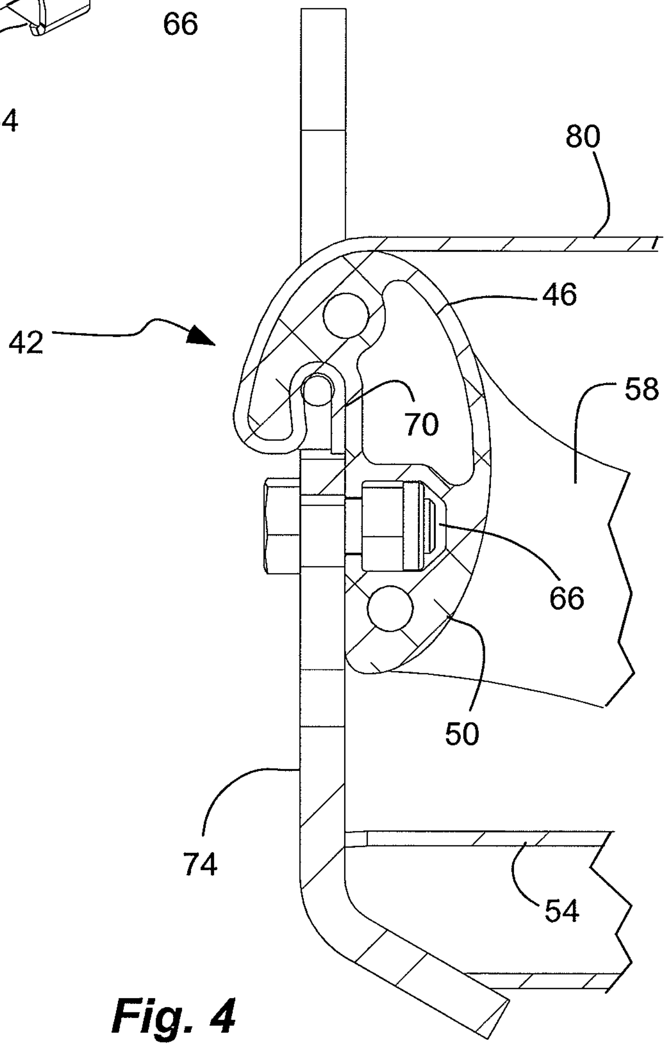
FIG. 4 is a detailed cross sectional view of the seat of the chair of FIG. 1*a* taken along line 4-4 of FIG. 1*a;*

With particular reference to FIGS. 1*c*, 3 and 4, the seat rails 50 can have elongate T-slots 66 extending the length of the rails and oriented longitudinally with respect to the rails and the chair. The T-slots 66 can be formed by elongated grooves oriented longitudinally with respect to the rails and the chair. The T-slots and/or grooves can have enlarged cavities and reduced openings into the cavities to form a generally T-shaped slot or groove. The T-slots, grooves, cavities and/or openings can be located in an outside of the rails and can face laterally outwardly. The T-slots, or enlarged cavities thereof, can receive a nut or bolt head of and accessory or component of the chair, with a rod of the bolt extending though the reduced opening to the accessory or component. In addition, the seat rails can also have longitudinally oriented elongated channels 70. The channels 70 can be oriented to face downwardly. The seat rails 50 can have a curvilinear cross-sectional profile including a curved top. For example, the seat rails can have a substantial elliptical cross-sectional shape or profile, such as a majority or three-quarters of an ellipse, with a major axes of the ellipse oriented vertically and a minor axes of the ellipse oriented horizontally (when the seat is in a horizontal configuration). The ellipse or elliptical cross-section can include three quadrants such as both upper and a lower inside quadrant, with a lower outside quadrant removed, or a downward and outward facing quadrant indented. The indentation can have a vertical wall facing outwardly and a horizontal wall facing downwardly. The T-slot 66, groove and/or cavity can be located in the lower inside quadrant with the opening in the vertical wall. The channel 70 can be in the upper outside quadrant with an opening to the channel in the horizontal wall. The upper inside quadrant can be hollow, and upper and lower longitudinal bores can be formed in the top or bottom, generally in the upper outside quadrant and the lower inside quadrant. Opposite ends of seat rails, T-slots, grooves, cavities, openings, channels, hollows and longitudinal bores can be open, and can form open ends. Thus, the bolt and nut, with the flange thereon, can be slid into position from the end. The open ends can be covered by caps for safety. The rails 50, T-slots 66 and channels 70 can be formed by an extrusion out of aluminum or the like. The seat rails with the T-slots are multifunction and can be used to configure the seat frame, couple the backrest to the seat, and couple accessories to the seat.

The seat 42 or seat frame 46 can utilize the T-slot 66 to secure the forward seat cross-bar 54 to the seat rails 50. The forward seat cross-bar 54 can include flanges 74 that extend upwardly from the cross-bar to the T-slots. The flanges 74 can be secured to the seat rails 50 by a bolt extending through an aperture in the flanges, through the opening of the T-slot, and into the cavity of the T-slot. A nut can be disposed in the cavity of the T-slot to receive the bolt. Tightening the bolt and nut fixes the flange, and thus the cross-bar, with respect to the seat rail. The rear seat cross-bar 54 can be secured in, to and/or over the open rear end of the seat rail 50. For example, the rear seat cross-bar 54 can cover the open rear end of the seat rails 50, and can be secured by bolts extending through apertures into the longitudinal bores. In addition, a backrest can be secured to the seat utilizing the T-slots, as described in greater detail below.

In addition, the seat 42 includes a single sheet of flexible and resilient plastic 80 carried by the seat frame 46 and held taut between the pair of seat rails 50. The plastic material of the sheet can be flexible to stretch under load, and resilient to return to its original configuration when unloaded. The sheet of plastic 80 can extend a width of the seat or seat frame, and extend over the curved or elliptical top of the seat rails 50. Lateral ends of the sheet of plastic 80 can be retained in the channels 70 of the seat rails. For example, the lateral end of the sheet can extend around a rod inserted into the channel. The lateral end of the sheet and the rod can be retained in the channel by a press fit or interference fit. For example, the uncompressed thickness of the sheet and the diameter of the rod can be greater than a width of the channel. In addition, the channel can have a slight widening width or profile from the opening to the bottom so that the bottom is wider than the top or opening of the channel to facilitate retention of the sheet. To assembly the seat, the lateral sides of the sheet of plastic (along with a retaining rod) can be inserted into the channels of the seat rails; the seat rails can be separated to stretch or pre-tension the sheet of plastic; and the seat cross-bars can be affixed to the seat rails to maintain the seat rails.

The sheet of plastic can extending a longitudinal depth of the seat from a forward end of the pair of seat rails to a rearward end of the pair of seat rails. A forward edge or end of the sheet of plastic can deflect downwardly to provide comfort to the user's thighs while seated, and during mobility or propulsion, because the seat frame is free of structure at the front end or edge. The sheet of plastic can be pre-tensioned between the seat rails so that the sheet of plastic is taut and in tension even when unloaded or without the user thereon. The single sheet of plastic provides a continuous, substantially flat (when held taut and without a user seated thereon) surface that can be easier to clean, such as by wiping off, than a plurality of separate and spaced apart straps. The sheet of plastic can include an anti-microbial or anti-bacterial to resist bacteria.

The sheet of plastic can include or can be a thermoplastic polyurethane (TPU) material. The TPU material has been found to be flexible and resilient, as well as tear resistant. The sheet of plastic or TPU can have a thickness of approximately 2 mm and can have a hardness of approximately 80 Shore A. In addition, the sheet of plastic or TPU can include a discrete or distinct region located closer to a rear of the seat with a plurality of apertures 88. The apertures can be contained within the sheet of plastic or within a width of the seat so that the sheet remains a single sheet. The apertures can be arranged in a pattern that is symmetric about a longitudinal axis of the seat. The region or pattern can be generally shaped as buttocks with a pair of adjacent lobes shaped as circles, semi-circles, or ellipses. The apertures in the sheet of plastic or TPU can allow for air circulation and/or heat dissipation for user comfort, and can further reduce pressure points. In addition, the region or pattern of apertures can allow for deformation of the plastic or sheet in the region or pattern different from deformation of the remainder of the sheet.

A pad (not shown, but similar to the pad shown in FIGS. 14*a-c*) can be disposed on the sheet of plastic 80 of the seat. The pad can be a thin foam layer, such as 1 inch thick, in a vinyl or terry cloth cover. Alternatively, the pad can be an air bladder or cushion. The sheet of plastic of the seat can have a non-slip texture on an upper surface thereof to resist sliding or movement of the pad, and thus the user. Alternatively, the pad can have a non-slip texture on a lower surface thereof. The pad can even out pressure across the sheet of plastic.

The upper surface of the sheet of plastic or the upper surface of the pad can form the seating surface upon which the user sits. Thus, the user can sit directly upon the sheet or plastic, or upon the pad on the sheet of plastic. It will be appreciated that a blanket, towel, clothing, etc., can be disposed between the user and the seating surface of the sheet of plastic or the pad. The sheet of plastic of the seat can be at least translucent, or can be translucent or transparent. For example, the TPU material of the sheet of plastic can be translucent or transparent. Thus, the position of the user or pad can be viewed from the bottom through the sheet of plastic to determine user positioning and/or any interference, such as bunched clothing, etc. In addition, the function of the chair can be viewed from the top through the sheet of plastic.

The sheet of plastic alone, or the sheet of plastic and the pad (one inch foam) together, can have an average peak pressure of less than 32 mmHg. In another aspect, the sheet of plastic and the pad (one inch foam) can together have an average peak pressure of less than 29 mmHg. These are averages of the peak pressures averaged over a one hour period.

Figure 5A:
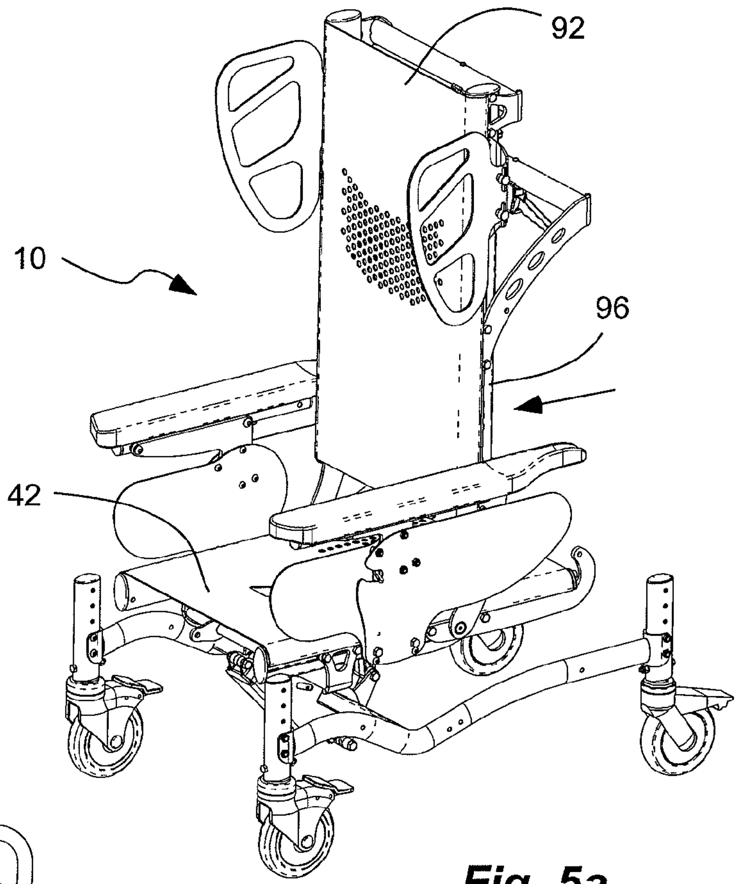
FIG. 5*a* is a perspective view of the chair of FIG. 1*a* shown in a reduced depth configuration.
Figure 5B:
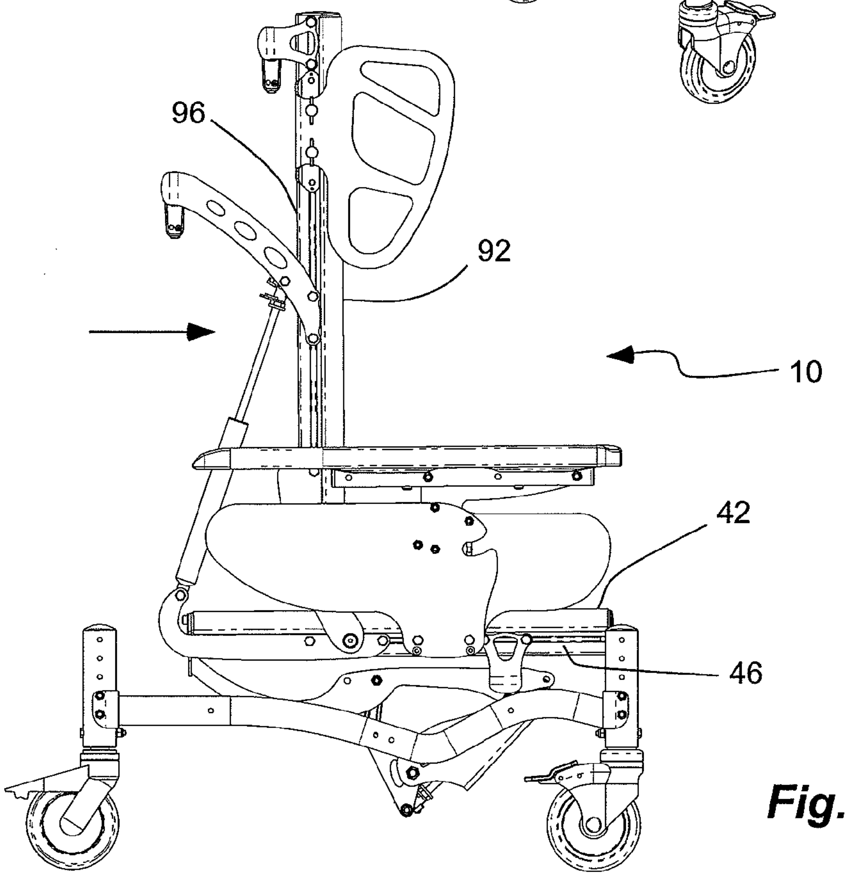
FIG. 5*b* is a side view of the chair of FIG. 1*a* shown in the reduced depth configuration.

The chair 10 can have a backrest 92 that is similar in many respects to the seat 42. The backrest 92 can have a backrest frame 96 with a pair of backrest rails 100 including left and right side backrest rails on respective sides of the backrest, and coupled to one another in a spaced-apart relationship by at least one backrest cross-bar. The backrest rails 100 can be structurally equivalent to the seat rails 50, and the above discussion with respect to the seat rails is herein incorporated by reference. The backrest rails 100 can have T-slots 104 formed by elongated grooves oriented longitudinally with respect to the backrest rails. The backrest rails and/or grooves can have enlarged cavities and reduced openings into the cavities. The backrest rails also having longitudinally oriented elongated channels 106. The backrest 92 can be coupled to the seat 42 utilizing the T-slots 66 of the pair of seat rails 50 of the seat frame 46. In addition, the backrest 92 and seat 42 or backrest frame 96 and seat frame 46 can be coupled or attached using the T-slots 66 and 104 of both. A pair of brackets or pivotal brackets 108 can be coupled between the seat 42 and the backrest 92, and can attach the backrest frame 96 to the seat frame 46. The pair of brackets 108 can be coupled to the T-slots 104 and 66 of the backrest rails 100 and the seat rails 50 using bolts extending through apertures in the brackets and into nuts in the T-slots. In addition, the pair of brackets 108 can be selectively locatable in the T-slots 66 of the seat rails 50 to selectively locate the backrest 92 with respect to the seat 42. For example, a depth of the seat can be selectively set between 15 and 21 inches from a forward end of the seat. The brackets 108 selectively locatable in the T-slots 66 of the seat rails 50 can allow the backrest 92 to be positioned forwardly, as shown in FIGS. 5*a* and 5*b*, or rearwardly, as shown in FIG. 1*c*. The brackets 108 can each include a pair of brackets pivotally coupled together by a pivot 110, including a lower bracket attached to the seat rails 50, such as by the T-slots 66, and an upper bracket attached to the backrest rails 100, such as by the T-slots 104, with the pivot 110 allowing the upper and lower brackets, and thus the seat and backrest, to pivot with respect to one another. The upper and lower brackets can form at least part of a recline mechanism, as described below. Alternatively, the brackets can be fixed or rigid brackets and can provide for a fixed angle of recline of the backrest with respect to the seat, which is usually sufficient for a mobility chair. For example, the fixed or rigid brackets can have a rigid L-shape with a lower part coupled to the seat frame and an upper part coupled to the backrest. It will be appreciated that different brackets can be provided to fix the angle between the backrest and the chair at predetermined angles. A recline mechanism can be used as discussed in greater detail below. The backrest rails with the T-slots are multifunction and can be used to configure the backrest frame, couple the backrest to the seat, and couple accessories to the backrest.

The backrest 92 or backrest frame 96 can include upper and lower backrest cross-bars 112 and 114. The backrest cross-bars 112 and 114 are similar to the seat cross-bar 54 described above, and which description is herein incorporated by reference. The backrest cross-bars 112 and 114 can be coupled to the T-slots 104 of the pair of backrest rails 100. The backrest cross-bars can be off-set behind the seat rails to allow the sheet of plastic to deflect, as discussed below. The backrest cross-bars can include flanges 118 that extend forwardly from the cross-bar to the T-slots. The flanges 118 can be secured to the backrest rails by a bolt extending through an aperture in the flanges, through the opening of the T-slot, and into the cavity of the T-slot. A nut can be disposed in the cavity of the T-slot to receive the bolt. Tightening the bolt and nut fixes the flange, and thus the cross-bar, with respect to the backrest rail. The lower backrest cross-bar 114 can be attached to the brackets 108, or upper portion thereof. The upper and lower backrest cross-bars 112 and 114 can be selectively positioned along the length of the backrest rails 100 to accommodate the location and positioning of other components. In addition, the upper backrest cross-bar can be located to provide a hand grip for a caregiver to grasp and maneuver the chair. Alternatively, a hand bar 122 can be coupled to the backrest or backrest frame using the T-slots of the backrest rails. The hand bar can be selectively positionable in the T-slots. The hand bar can include a hand grip bar extending the width of the backrest with flanges attached to the T-slots. The hand bar can increase leverage during lowering and raising of the resident or patient. The hand bar 122 can extend further from the backrest or backrest frame than the backrest cross-bars. The hand bar can have an extend position extending away from, or perpendicularly to, the backrest or backrest frame; and a folded position against the backrest or backrest frame.

A single sheet of flexible and resilient plastic 124 can be carried by the backrest frame 96 and held taut between the pair of backrest rails 100. As described above with respect to the seat, lateral ends of the sheet of plastic can be retained in the channels 106 of the pair of backrest rails 100. The sheet of plastic can extending a height of the backrest, and/or a length of the backrest rails from a lower end of the pair of backrest rails to an upper end of the pair of backrest rails. The sheet of plastic of the backrest can include a plurality of apertures for air circulation and/or heat dissipation. Alternatively, the sheet of plastic of the backrest can be a solid, continuous sheet without interruption. In addition, the sheet of plastic of the backrest can be translucent or transparent. The user and/or backrest pad can be visible from behind through the sheet of plastic of the backrest.

Figure 6A:
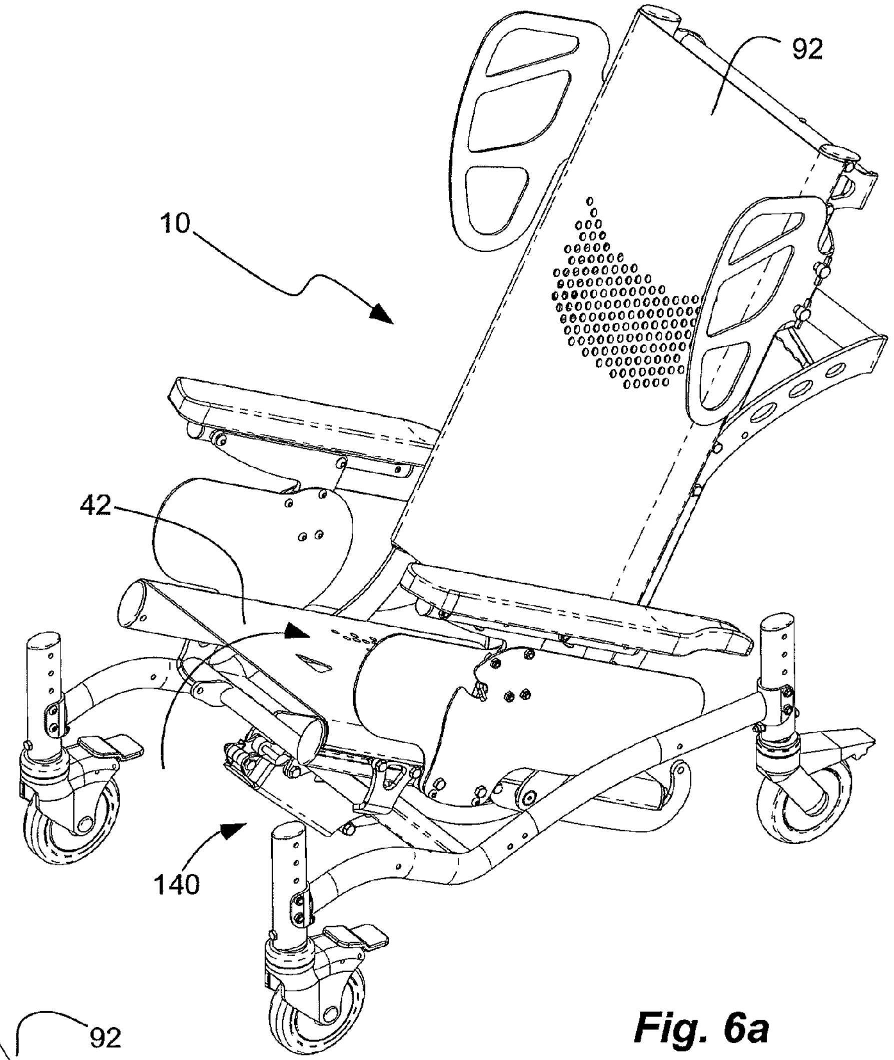
FIG. 6*a* is a perspective view of the chair of FIG. 1*a* shown in a tilted configuration.
Figure 6B:
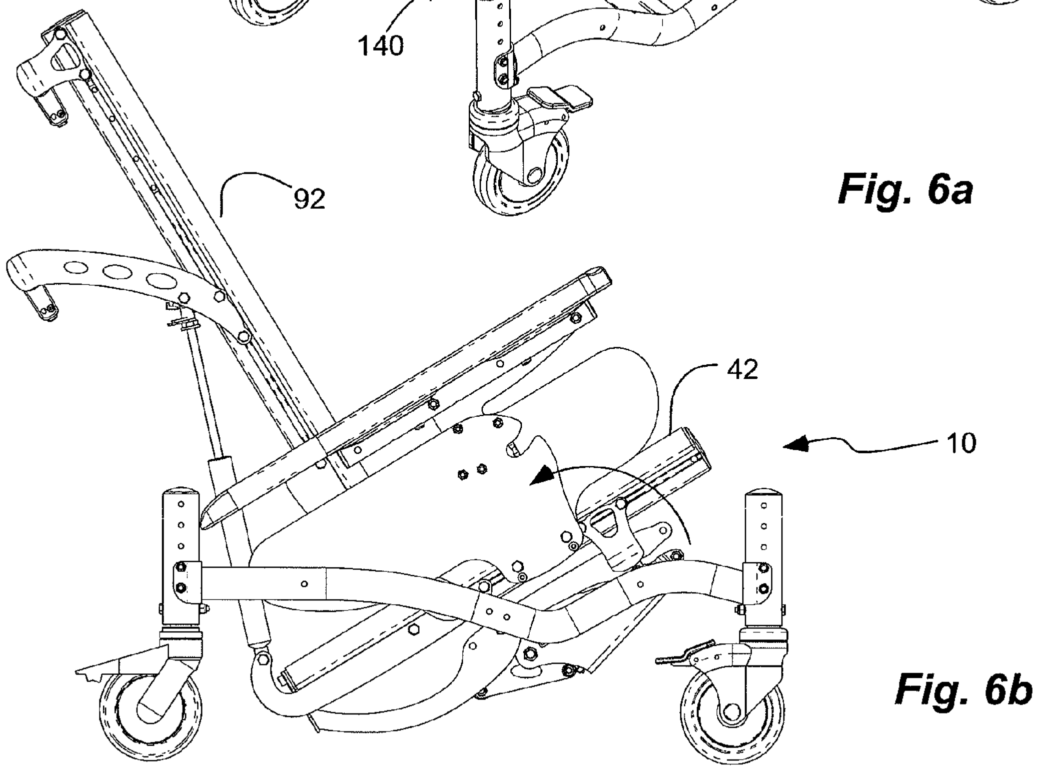
FIG. 6*b* is a side view of the chair of FIG. 1*a* shown in the tilted configuration.
Figure 6C:
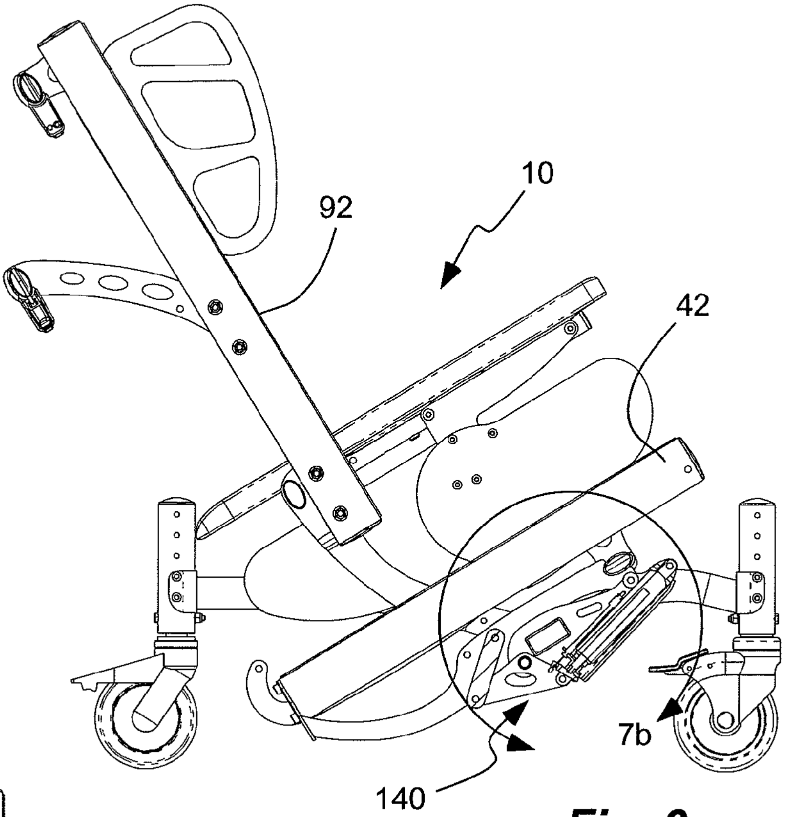
FIG. 6*c* is a cross-sectional side view of the chair of FIG. 1*a* taken along a longitudinal centerline of the chair and shown in the tilted configuration.
Figure 6D:
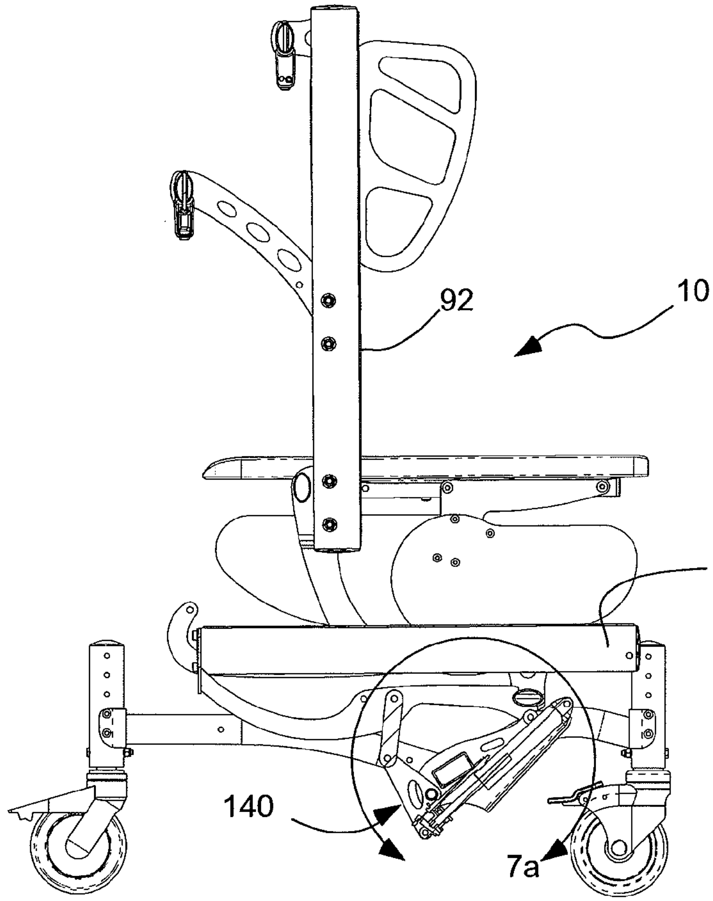
FIG. 6*d* is a cross-sectional side view of the chair of FIG. 1*a* taken along a longitudinal centerline of the chair and shown in the upright configuration.
Figure 7A:
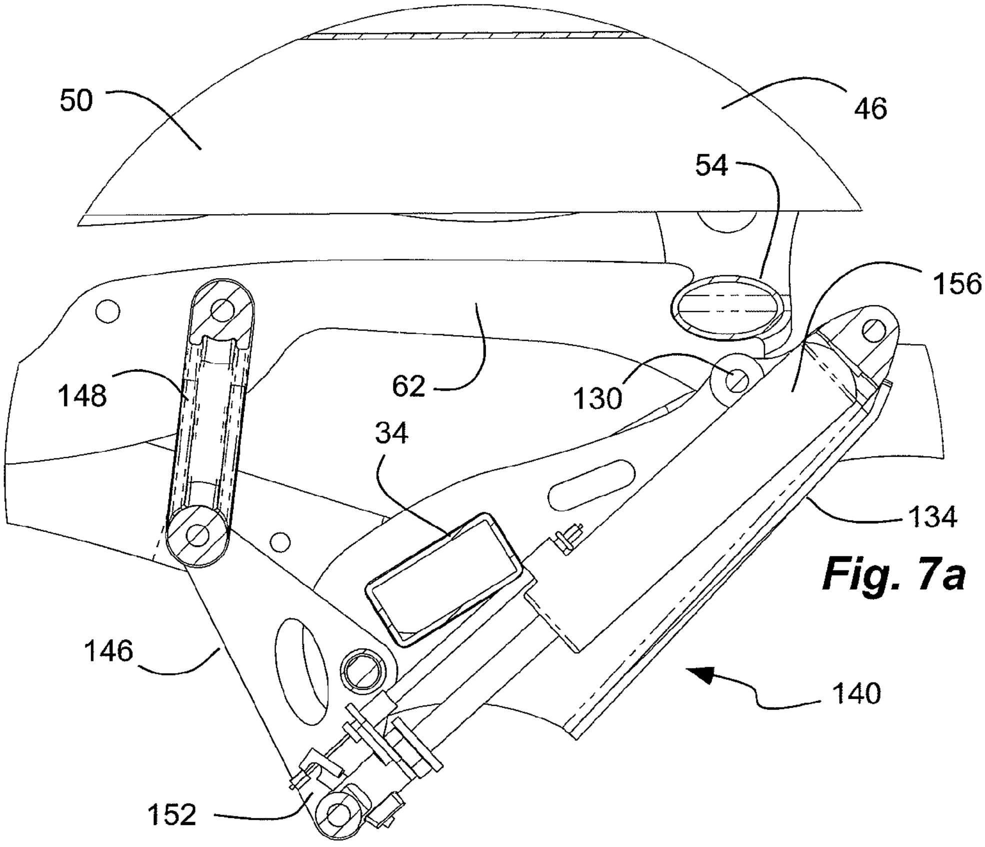
FIG. 7*a* is a detailed cross-sectional view of the chair of FIG. 1*a* showing a four-bar linkage and gas spring with the chair in the upright configuration.
Figure 7B:
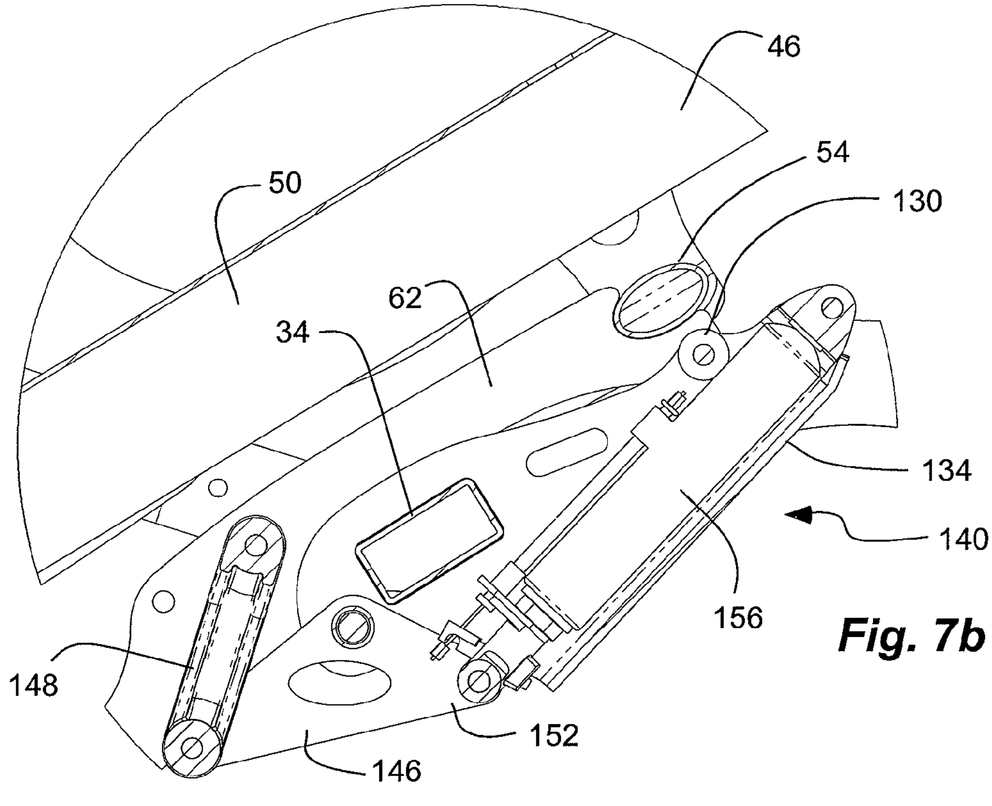
FIG. 7*b* is a detailed cross-sectional view of the chair of FIG. 1*a* showing the four-bar linkage and gas spring with the chair in the tilted configuration.
Figure 7C:
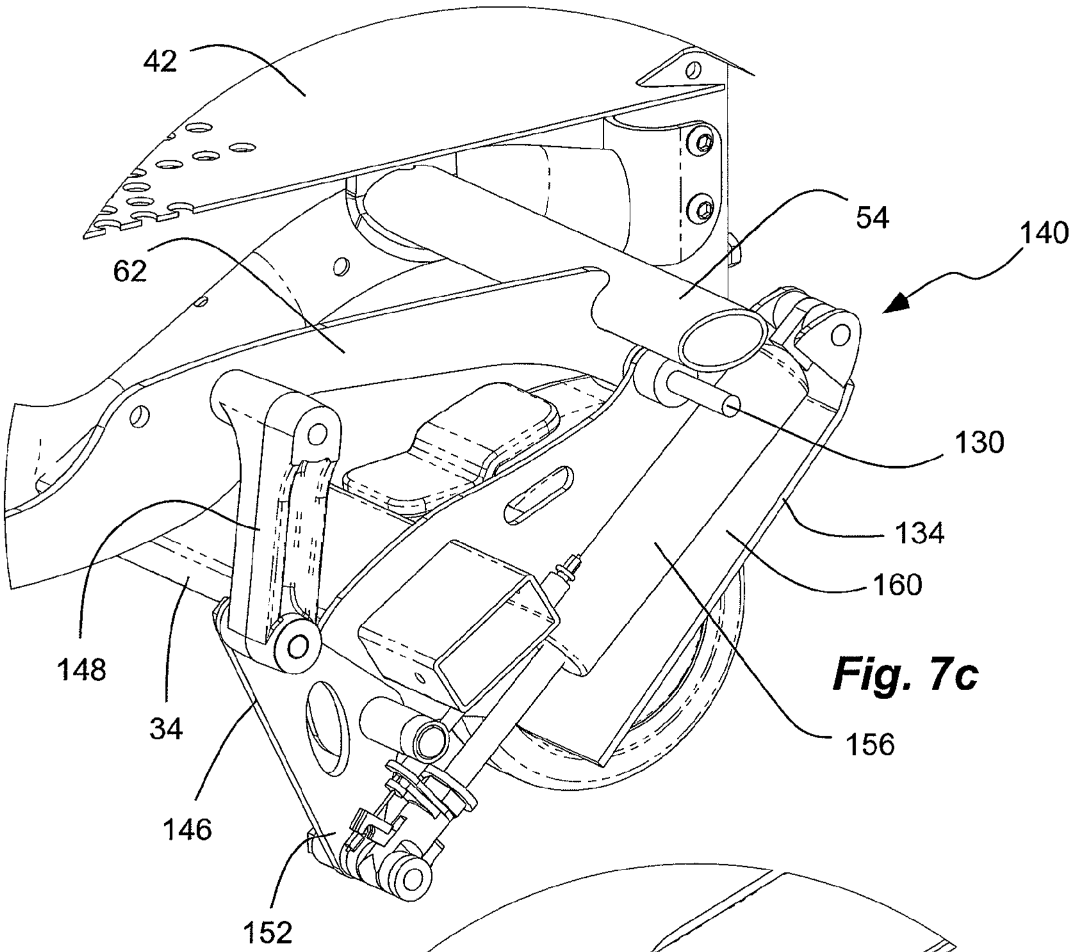
FIG. 7*c* is a detailed cross-sectional perspective view of the chair of FIG. 1*a* showing a four-bar linkage and gas spring with the chair in the upright configuration.
Figure 7D:
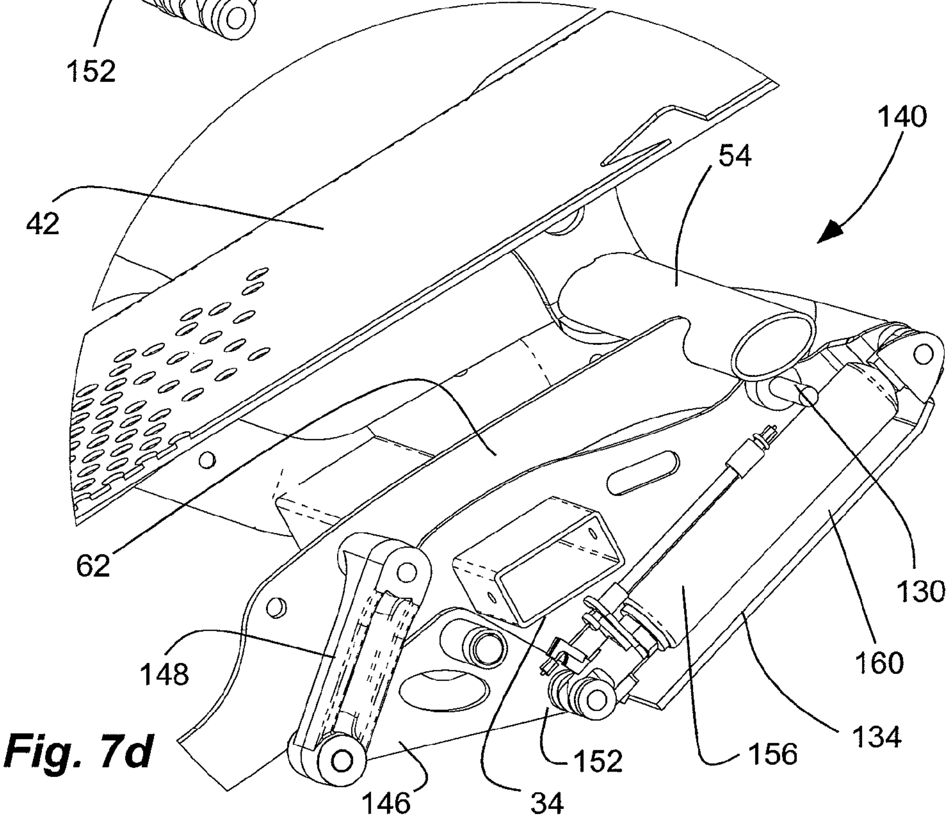
FIG. 7*d* is a detailed cross-sectional perspective view of the chair of FIG. 1*a* showing the four-bar linkage and gas spring with the chair in the tilted configuration.
Figure 8A:
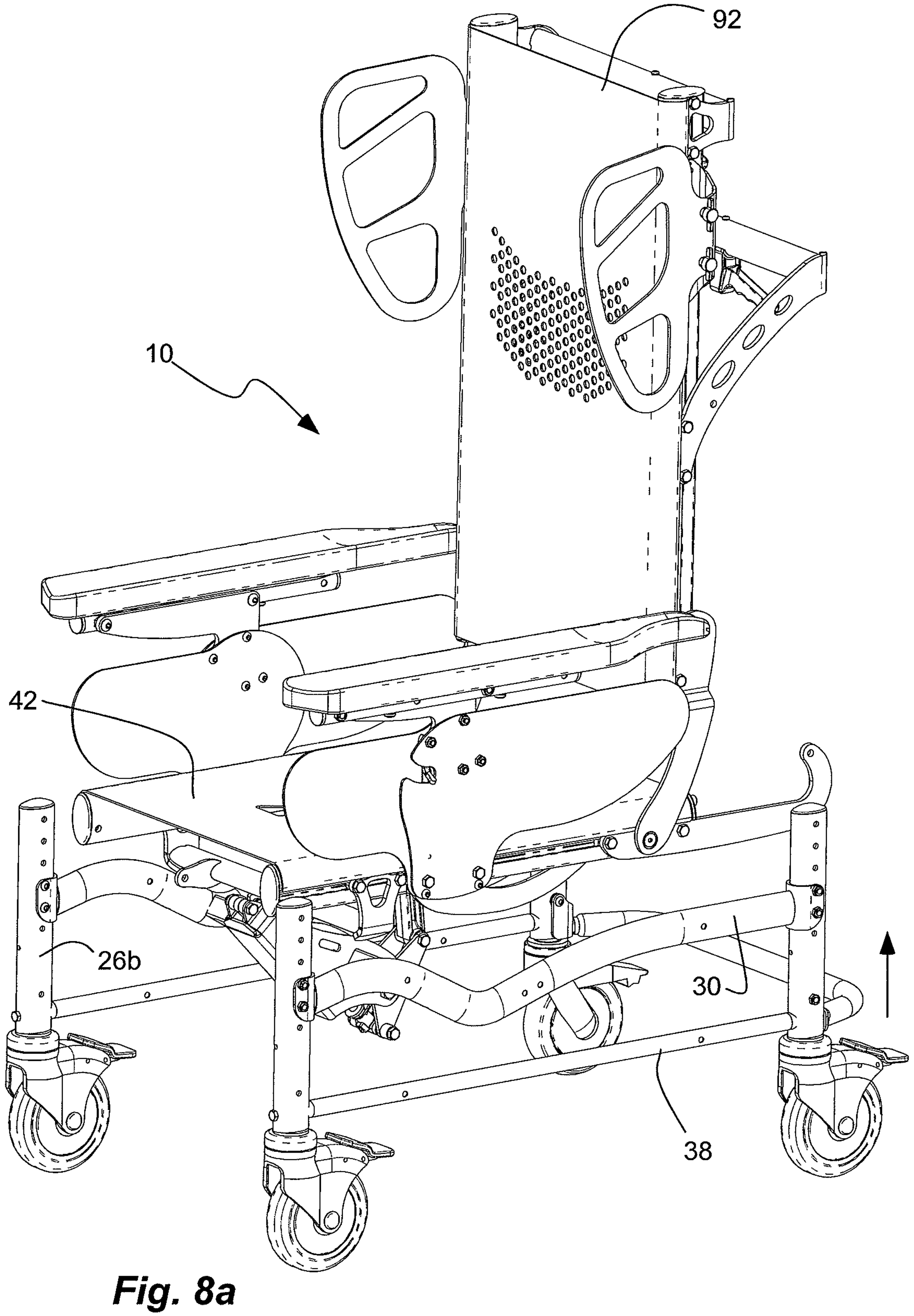
FIG. 8*a* is a perspective view of the chair of FIG. 1*a* shown in an elevated configuration with taller caster posts and with the recline mechanism.

As described above, the backrest 92 or the backrest frame 96 can be fixed with respect to the seat 42 or the seat frame 46 by the brackets 108. The seat 42, and thus the backrest 92, can be pivotally coupled to the base frame 18 at a pivot coupling 130 (FIGS. 7*a-d*). As described above, the center spar(s) 62 has a forward end coupled to the base frame 18 of the wheel base by the pivot coupling. The base frame 18 of the wheel base 14 can further include a center hub 134 (FIGS. 2, 8*b* and 7*a-d*) extending to a forward end at the pivot coupling. The pivot coupling can be located closer to a front of the seat and a front of the wheel base to allow for social interaction and resist disorientation of the user. The seat and backrest can tilt together with respect to the base frame 18 with the seat between substantially horizontally (as shown in FIGS. 1*a-e*) and a tilted configuration (as shown in FIGS. 6*a* and 6*b*). In one aspect, the seat can tilt at least 30 degrees from horizontal. In another aspect, the seat can tilt up to 32 degrees from horizontal.

Referring to FIGS. 7*a-d*, the chair 10 can also include a tilt mechanism 140 coupled between the seat frame 46 of the seat 42 and the base frame 18 of the wheel base 14 to selectively allow the seat (and backrest along with the seat) to pivot or tilt from horizontal to an inclined orientation, and to lock the seat in the desired orientation. In addition, the tilt mechanism 140 can be disposed underneath the seat 42 to keep an area behind the seat and/or the backrest clear to accommodate the tilting, and the reclining. Furthermore, the tilt mechanism 140 can be centered with respect to the seat, and have a width less than 3 inches (with one gas spring or less than 5.5 inches with two gas springs), to remain clear of the user's legs during mobility or propulsion.

The tilt mechanism 140 can include a four-bar linkage coupling the seat frame to the base frame of the wheel base. The four-bar linkage can include: the center hub 134 of the base frame 18, which can define a base link that remains fixed or stationary; the center spar(s) 62 of the seat frame 42 pivotally coupled to the center hub (at the pivot coupling 130 at their forward ends) and forming a link; and a pair of links 146 and 148 pivotally coupled in series between the center hub and the center spar. The pair of links 146 and 148 pivot toward one another and the spar(s) 62 pivots towards the center hub 134 as the seat tilts. One of the links can have lobe or extension 152. A gas spring 156 can be coupled between at least two of the links, such as the lobe or extension 152 and the frame base or center hub 134. The gas spring can selectively lock the four bar linkage in place and thus selectively maintain the tilt of the seat. The four-bar linkage and the gas spring can be adapted to so that the gas spring has very little movement or displacement of the gas spring, and has a flat force curve (substantially flat or horizontal on force versus stroke plot) over the range of motion of the four-bar linkage, or the range of tilt. It will be appreciated that gravity helps to tilt the seat, but works against raising the seat. In addition, the gas spring can be disposed in a gap 160 of the center hub 134 to protect the movement of the gas spring. The center hub can have a U-shape defining the gap. The cross-bar 34 of the base frame 18 can extend through the center hub and gap therein, and through the four-bar linkage.

The gas spring can include one or more gas springs each including a piston having a piston rod extendible from a proximal end of a cylinder. The piston rod can be compressed into the cylinder to a compressed position, and pulled or extended out of the cylinder to an extended position. The piston rod can also be selectively and adjustably positioned at any intermediate position between the extended position and the compressed position. The gas spring can also include a locking mechanism. The locking mechanism can lock the piston rod in either the extended position or the compressed position or in any position between the extended compressed positions. The locking mechanism can include an actuator such as a locking lever that can be positioned on piston rod. The locking lever can pivot to engage or disengage an internal lock in the cylinder, such as an internal valve (not shown) that hydraulically secures the position of the piston anywhere mid-stroke, and not just in the extended position. When engaged, the internal lock can secure the piston rod from movement within the cylinder. When disengaged, the piston can slide into or out of the cylinder between the compressed position and the extended position. The locking mechanism can include fittings for an actuation device, such as a Bowden cable, which cable can extend to a handle at a remote location (such as on the upper backrest cross-bar or hand bar) away from the gas spring and allow remote actuation of the locking mechanism from the remote location. The gas spring can include a piston attachment point disposed on a distal end of the piston rod. Additionally, the gas spring can also include a cylinder attachment point disposed on a distal end of the cylinder. The gas spring attachment points can pivotally couple the gas spring to either fixed or moving structures. One end, such as the cylinder end, can be coupled to the center hub 134 forward and above the pivot coupling, while the other end, such as the piton end, can be coupled to the lobe 152 of one of the pair of links 146.

As described above, the base frame 18, and thus the seat and the backrest, are vertically moveable with respect to the casters between a plurality of elevational heights ranging from 13 to 21 inches of the seating surface. The seating surface can be lowered to 13 inches with the reclining mechanism disposed under the seat, and even with the seat tilted as much as 30 degrees or even 32 degrees, as shown in FIGS. 6*a* and 6*b*.

In addition, the chair 10 can have armrests 174 including left and right armrests on opposite sides of the chair or seat 42. The armrests 174 can be coupled to the seat 42 to tilt with the seat, and thus resist formation of a gap between the armrests and backrest during tilt. The armrests 174 can be attached to the seat at the T-slots 66 of the seat rails 50 using a bolt extending through an aperture in the armrest and into a nut in the T-slot. In addition, a spacer can be positioned between the T-slots and the arm rests to laterally space the arm rests from the seat. The armrests 174 can be selectively secured in the T-slots to selectively position the armrests with respect to the seat and backrest. In addition, the armrests can be vertically adjustable to select the height of the armrest, as discussed below. Furthermore, the armrests can have an elongate upper surface extending past the backrest to resist gaps between the armrest and the backrest during recline, as discussed below.

The chair 10 as described above is configured as a mobility chair for patients or residents who are ambulatory and capable of self propulsion using their legs by sitting in the chair with their feet contacting the floor, as shown in FIGS. 1*a*-7*d* (and even 8*a* and 8*b*). The seating surface of the seat or chair can have an elevational height of between 13 to 17 inches with respect to the floor. In addition, the seat can be elevated with the taller caster posts so that the seat or chair can have an elevational height of between 18 to 21 inches with respect to the floor. Furthermore, the seat or seating surface can be tilted between horizontal and inclined, such as up to 32 degrees with respect to horizontal. The backrest can be fixed or reclinable with respect to the seat.

Figure 9C:
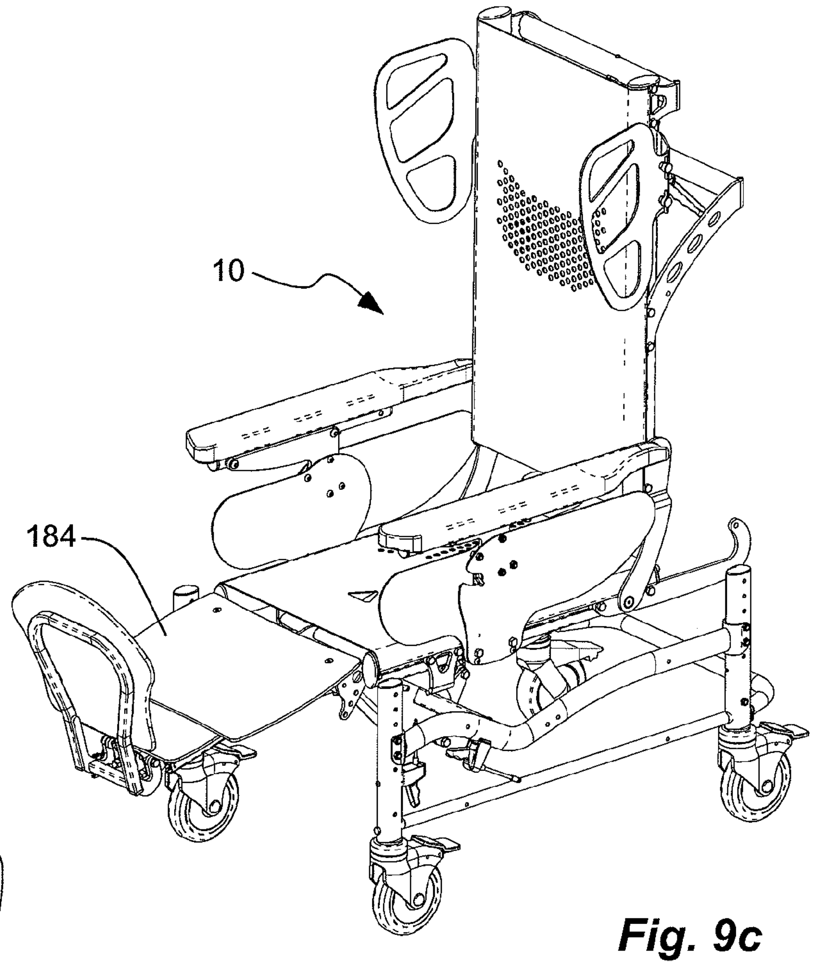
FIG. 9*c* is a perspective view of the chair of FIG. 1*a* shown in the positioning configuration and in the elevated configuration with taller caster posts, the recline mechanism and the foot rest in an elevated configuration.
Figure 9B:
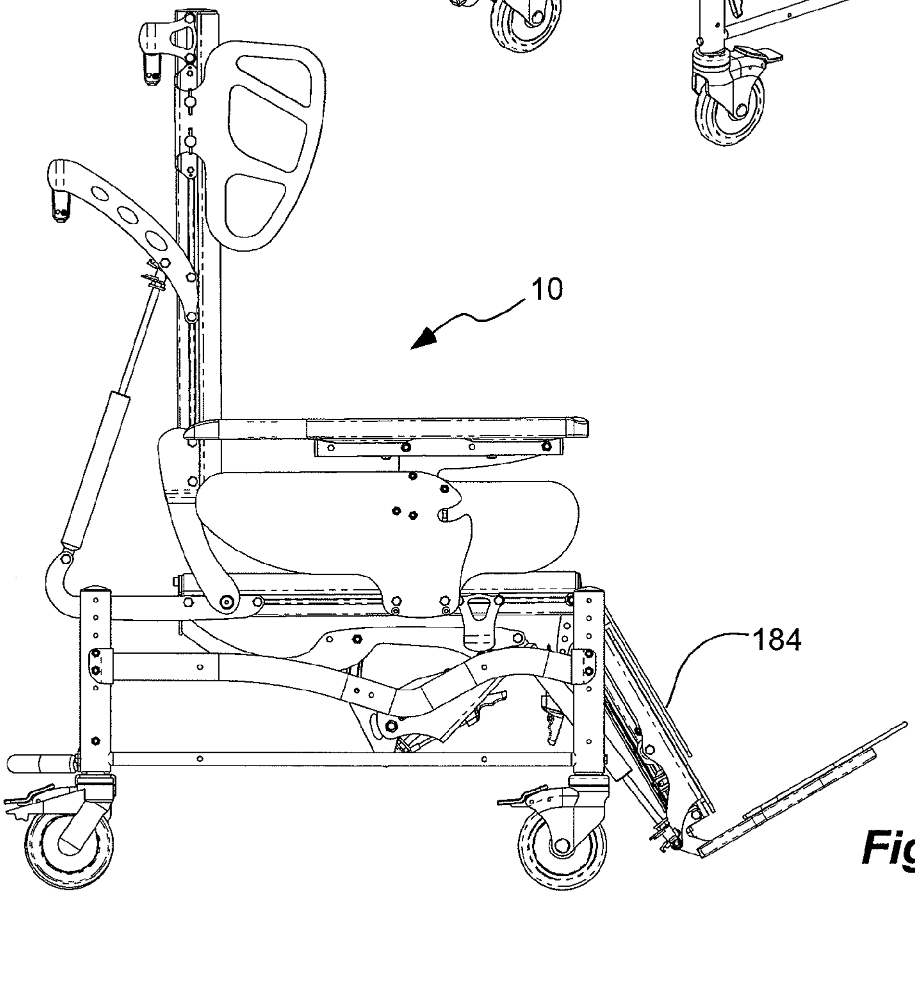
FIG. 9*b* is side view of the chair of FIG. 1*a* shown in the positioning configuration and in the elevated configuration with taller caster posts, the recline mechanism and the foot rest.

The chair 10 described above, configured as a mobility chair, can be reconfigured as a positioning chair by adding various accessories or components, and/or by interchanging some components. For example, the taller caster posts 26*b* can replace the shorter caster posts 26 to elevate the base frame 18 to accommodate the addition of a footrest and/or legrest 184, as shown in FIGS. 9*a-c*. The footrest 184 can be pivotally coupled to the seat or seat frame.

Figure 11A:
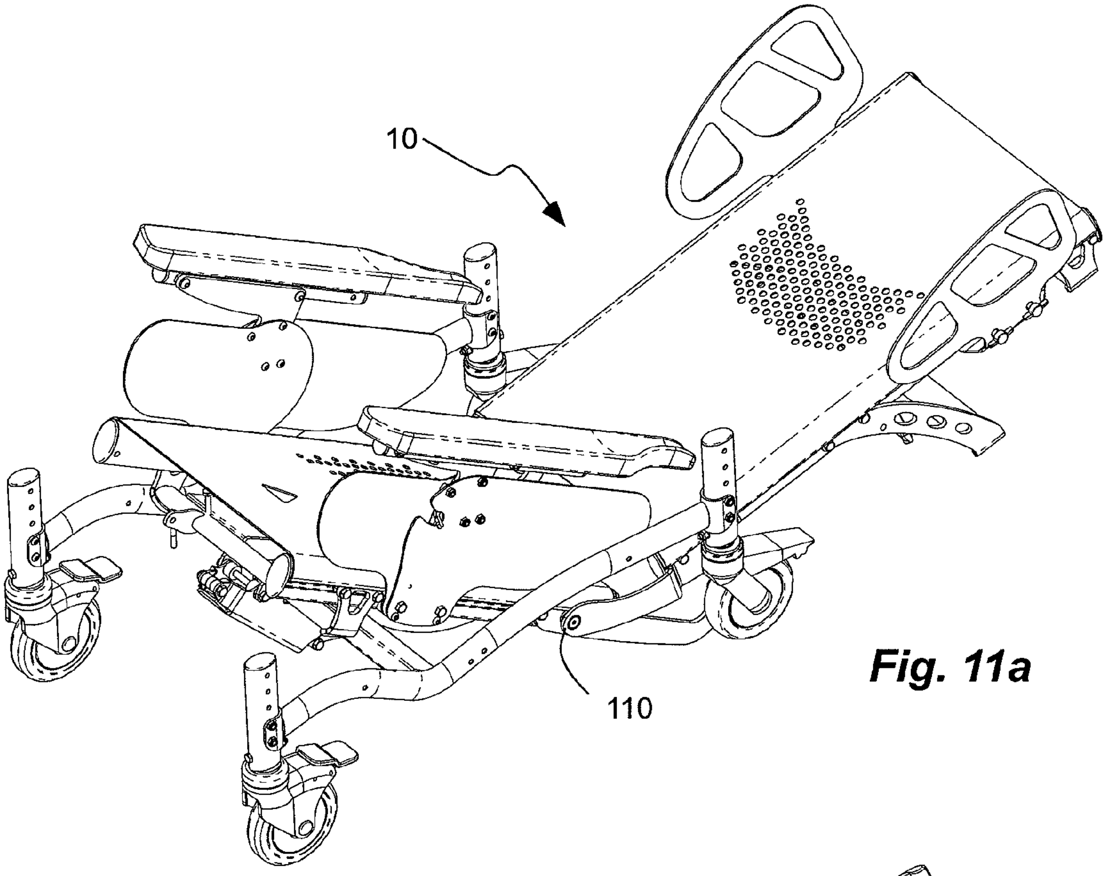
FIG. 11*a* is a perspective view of the chair of FIG. 1*a* shown in the mobility configuration and in the tilted configuration and in the fully reclined configuration and with the recline mechanism.

As another example, a recline mechanism can be used, or can replace, fixed or rigid brackets to allow the backrest 92 to recline with respect to the seat 42, as shown in FIGS. 10*a* and 10*b*, in addition to tilting with the seat, as shown in FIGS. 11*a* and *b*. Thus, the backrest 92 can recline with respect to the seat 42, and the backrest frame 96 can be pivotally coupled to the seat frame 46. The chair can further include a recline mechanism 194 coupled between the backrest 92 and the seat 42. The recline mechanism 194 can utilize the T-slots 104 and 66 of the backrest rails 100 and the seat rails 50. As described above, the brackets 108 can form or be included in the recline mechanism 194 and can be selectively locatable in the T-slots 66 of the seat rails 50 to selectively locate the backrest 92 with respect to the seat 42, and selectively set a depth of the seat, such as between 15 and 21 inches from the forward end of the seat. The recline mechanism 194 can include a pair of brackets pivotally coupled together about a pivot 110, with one bracket attached to the seat, and the other bracket attached to the backrest, as described above. A locking mechanism, such as a gas spring 196, can be coupled between the seat and backrest. The seat, seat frame, seat rail or lower bracket can include a rearward extension 198 extending beyond the rear of the seat. The gas spring 196 can be coupled between the extension 198 and the backrest, such as the hand bar 122. The gas spring can be similar or the same in operation to the gas spring described above. Alternatively, the locking mechanism can include an infinite clutch that can be associated with the recline mechanism, to selectively lock the pair of brackets with respect to one another. In addition, one or more bias mechanisms or means can be used for biasing the backrest, such as towards a forward position, and for assisting in lifting the user in the chair. The bias mechanism or means can include one or more clock springs, such as a clock spring on each side of the chair. The recline mechanism can allow the backrest to recline from −10 to 45 degrees.

The recline mechanism 194 with the pivot brackets 108 and the fixed or rigid brackets can be interchangeably coupled between the seat frame 96 and the backrest frame 46 to form a fixed angle backrest when the pair of fixed or rigid brackets is attached, or a reclining backrest when the recline mechanism or pivot brackets are attached.

Figure 11B:
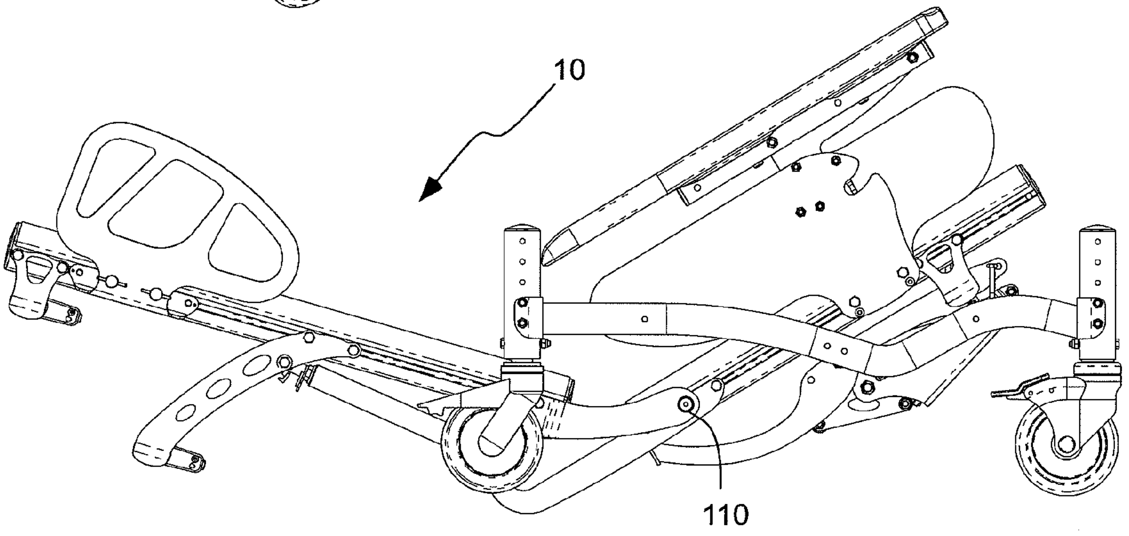
FIG. 11*b* is a side view of the chair of FIG. 1*a* shown in the mobility configuration and in the tilted configuration and in the fully reclined configuration and with the recline mechanism.

The reclining of the backrest 92 with respect to the seat 42 can be independent of the elevational height of the seat 42 and frame base 18 with respect to the casters 22. FIGS. 11*a* and 11*b* show the backrest 92 in a full recline position, with the seat 42 in a full tilt position.

Thus, the chair can have a positioning configuration, as shown in FIGS. 9*a*-11*b*. Additional components can be added to the chair for the positioning configuration, including for example, wings, neck rest, terrycloth pads, shoulder bolster, side panels, etc. In addition, other accessories can be secured to the T-slots of the seat and/or backrest rails, including for example, an IV pole, an oxygen tank holder, etc. By way of example, lateral supports or wings can be coupled to the T-slots 104 of the backrest rail 100. The wings can have a support 202 covered by padding and a cover (not shown). The support 202 can be coupled using a bracket with a nut insertable through the opening of the T-slot in one orientation, but retained therein in another orientation, so that the wings can be added between the upper and lower backrest cross-bars. The supports 202 can be laterally and/or longitudinally adjustable.

Therefore, the chair can have at least two configurations, including the mobility configuration and the positioning configuration. In the mobility configuration, the seating surface is selectively vertically positionable between an elevation of at least 13 to 17 inches. In addition, the backrest can be fixed with respect to the seat. In the mobility configuration, the chair has the first plurality of shorter caster posts 26 and the pair of pivotal brackets 108, or fixed or rigid brackets, coupled between the seat and the backrest. A depth of the seat can be selected between 15 and 21 inches from the forward end of the seat. In the positioning configuration, the seating surface is selectively vertically positionable between an elevation of at least 18-21 inches. In addition, the backrest can tilt with respect to the seat.

In the positioning configuration, the chair has the second plurality of taller caster posts 26*b*, interchangeable with the first plurality of shorter caster posts; the pair of additional side braces 38; the recline mechanism 194 with the pivotal brackets 108, interchangeable with the pair of fixed or rigid brackets; and the leg rest 184 pivotally coupled to the seat. A method of converting the chair from the mobility configuration to the positioning configuration includes one or more of: removing the first plurality of shorter caster posts 26 from the base frame 18 of the wheel base 14; adding the second plurality of taller caster posts 26*b* to the base frame of the wheel base; removing the pair of fixed or rigid brackets from between the seat frame 46 and backrest frame 96; adding the recline mechanism 194 with the pivot brackets 108 between the seat frame 46 and backrest frame 96 by attaching the recline mechanism to the T-slots 66 and 104 of the seat rails 50 and backrest rails 100; and attaching the leg rest 184 to the seat frame. In addition, the additional side braces 38 and rear brace 40 can be added to the frame base and/or wheel base. It will be appreciated that the method can be reversed to convert the chair from the positioning configuration back to the mobility configuration.

Figure 12A:
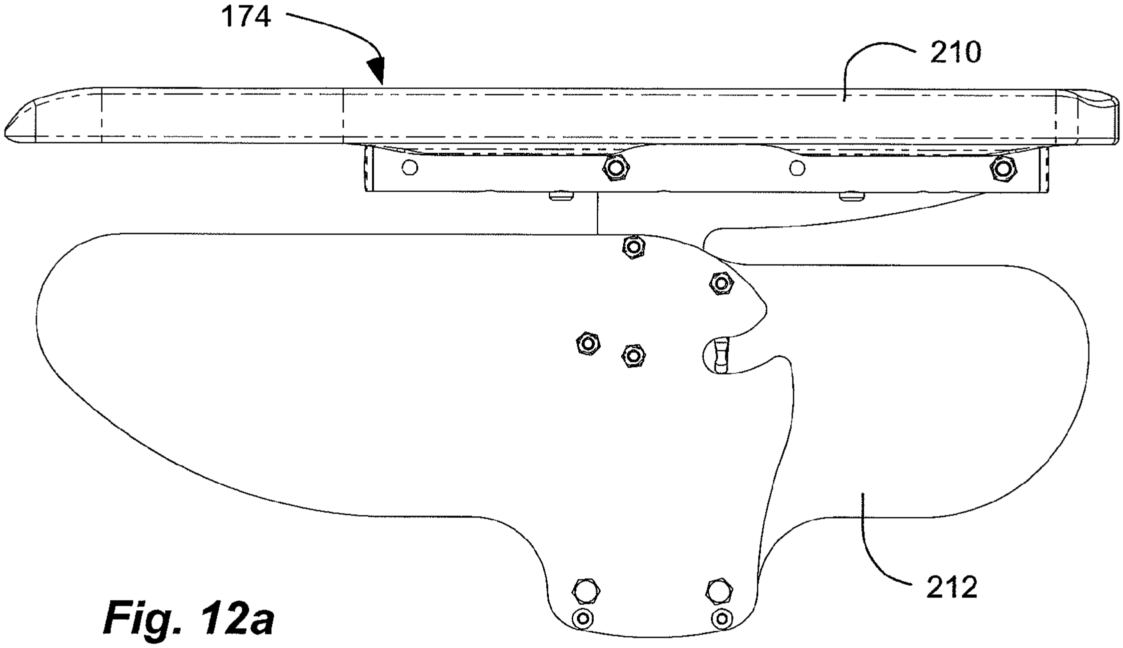
FIG. 12*a* is a side view of an adjustable armrest of the chair of FIG. 1*a*, shown in a lowered configuration.
Figure 12B:
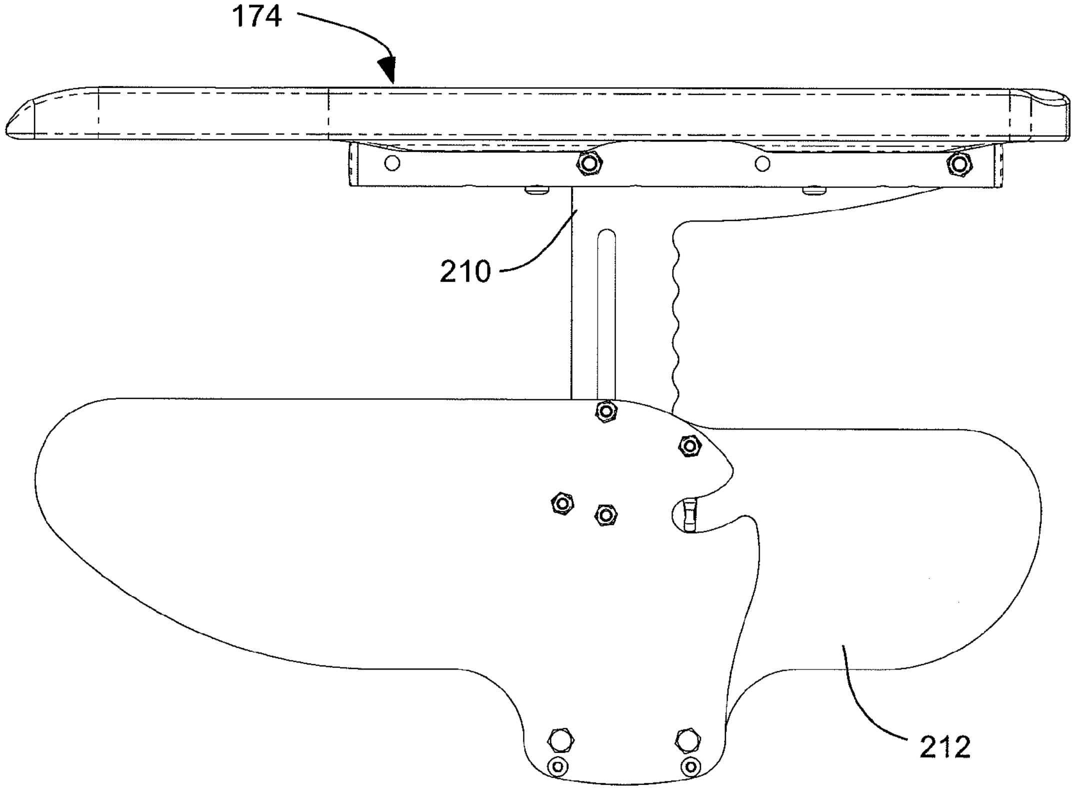
FIG. 12*b* is a side view of the adjustable armrest of the chair of FIG. 1*a*, shown in a raised or elevated configuration.
Figure 12C:
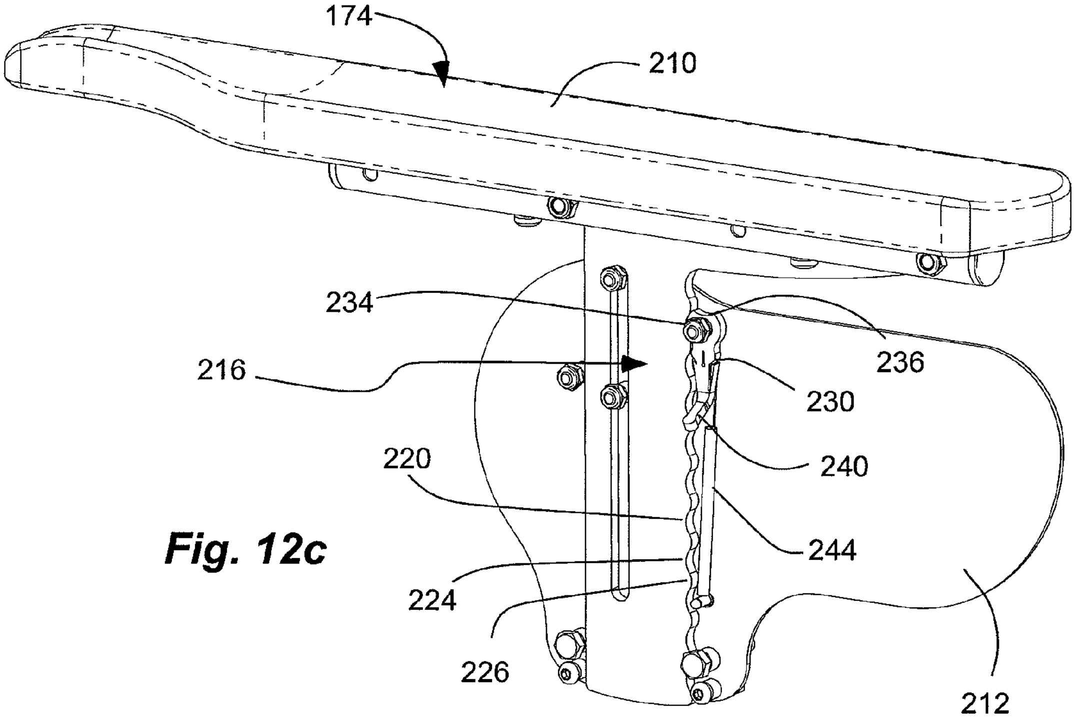
FIG. 12*c* is a side view of the adjustable armrest of the chair of FIG. 1*a*, shown in a lowered configuration and with a portion thereof removed.
Figure 12D:
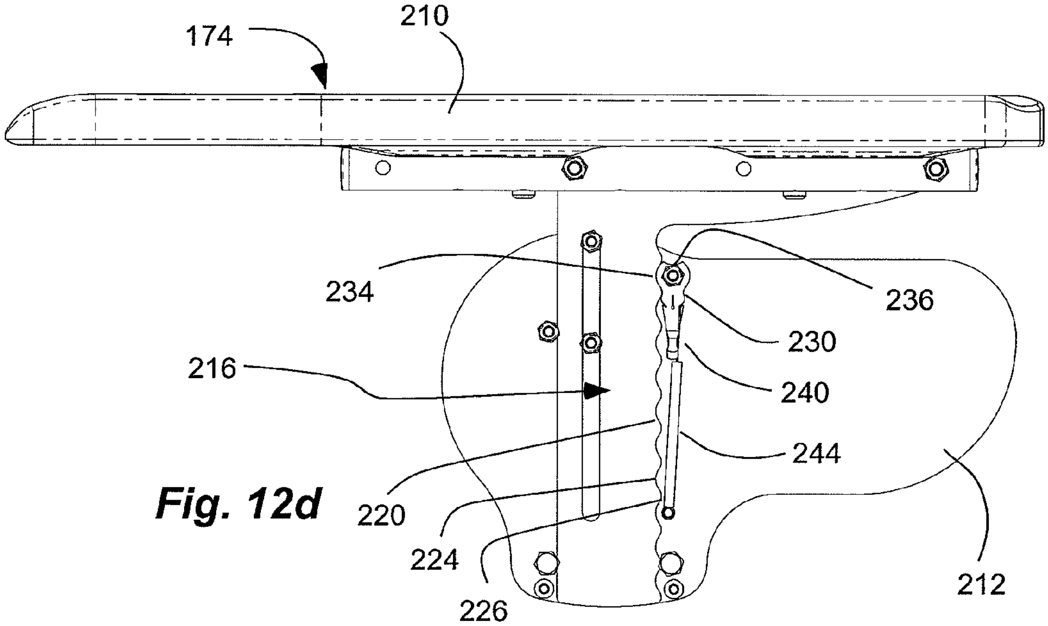
FIG. 12*d* is a side view of the adjustable armrest of the chair of FIG. 1*a*, shown in a raised or elevated configuration and with a portion thereof removed.
Figure 13A:
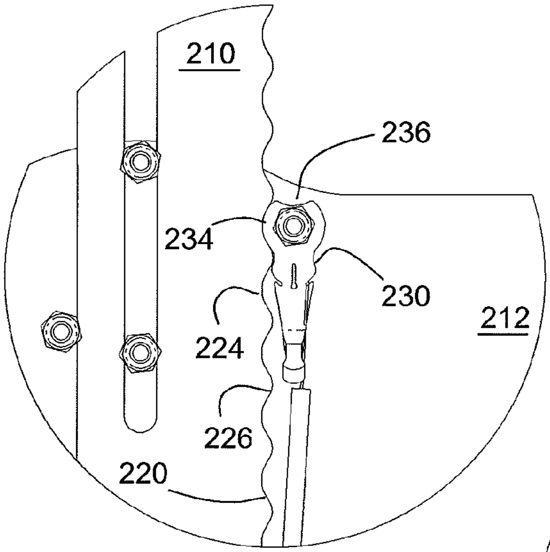
FIGS. 13*a-d* are a partial side views of an indexing mechanism of the adjustable armrest of the chair of FIG. 1*a*, shown in different configurations.
Figure 13B:
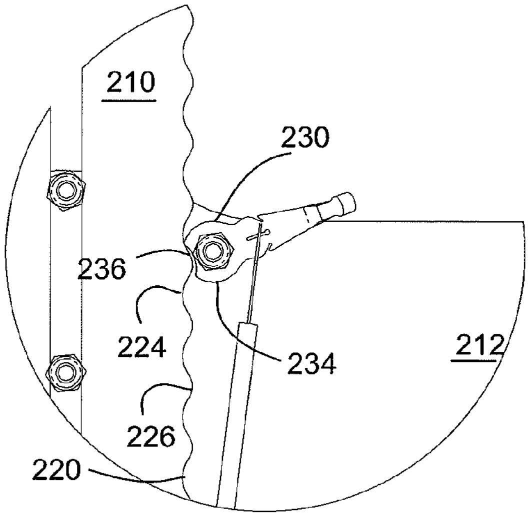
Figure 13C:
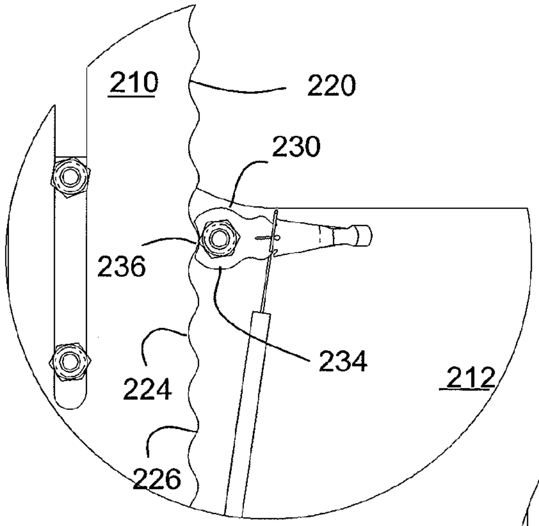
Figure 13D:
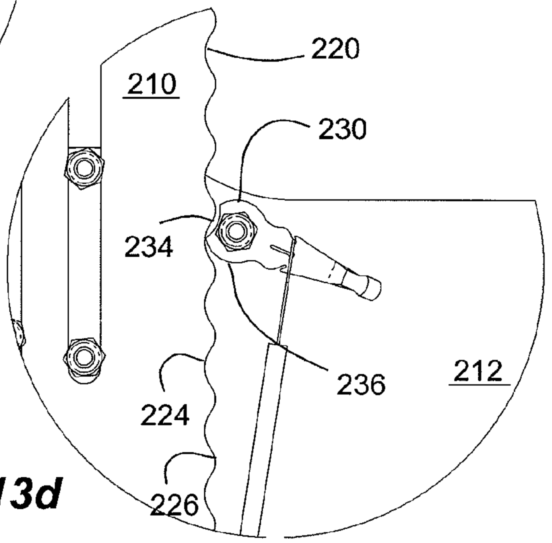

As mentioned above, the arm rests 174 can be adjustable, or can have an adjustable elevational height. The arm rest, or upper portion thereof, can have a lowered position, as shown in FIGS. 12*a* and 12*c*, and a raised or elevated position, as shown in FIG. 12*b*. In addition, the arm rests, or adjustability thereof, can be configured to resist free-fall, or the sudden adjustment of the arm rest downwardly, in order to resist injury. Thus, the arm rests can be configured to index or incrementally adjust up and/or down. Referring to FIGS. 12*a*-13*d*, the armrests can each have an upper portion 210 vertically adjustable with respect to a base portion or lower portion 212 at discrete intervals. The armrests can include an adjusting or indexing mechanism 216 coupled between the upper and lower portions 210 and 212. The mechanism 216 can include an edge 220 with a wavy profile including a plurality of alternating concave indentations 224 and convex protrusions 226. The edge 220 can be associated with the upper portion, such as by being formed on a vertical column thereof. Alternatively, the edge could be associated with the base portion, such as by being formed on a vertical column thereof.

A cam 230 can be associated with the other of the upper portion or the base portion, such as the base portion. For example, the cam can be pivotally coupled to the vertical column of the base portion. The vertical columns of the upper portion and base portion can slidably engage one another. In addition, the cam 230 can be disposed adjacent the edge 220. The cam 230 can have a convex portion 234 that can match or engage the concave indentation 224 of the edge 220, and a concave portion 236 that can match or engage the convex protrusion 226 of the edge 220. The cam 230 can be pivotal to displace the edge 220 with the convex portion 234 of the cam pivoting in the concave indentation 224 of the edge, and the concave portion 236 of the cam engaging the convex protrusion 226 of the edge to displace the edge as the cam pivots. An arm 240 can extend from the cam 230 to be engaged by a user to pivot the cam. In addition, a spring 244 can be coupled to the cam, or between the cam and the base portion, to bias the cam with the convex portion 234 in the concave indentation 224, thus resisting the upper portion from moving with respect to the base portion, and the vertical columns from sliding with respect to one another. Engaging the arm 240 and pivoting the cam 230 causes the cam to turn with the concave portion 236 thereof engaging the convex protrusion 226 of the edge 220, thus displacing the edge 220 and the upper portion and vertical column thereof. To raise the armrest, the arm and cam can be pivoted approximately ninety degrees, displacing the convex portion 234 out of the concave indentation 224 of the edge, and raising the upper portion 210 of the armrest until a convex portion 226 of the edge 220 enters the concave portion 236 of the cam 230. Continuing to raise or hold the upper portion 210 of the armrest while releasing the arm 240 and cam 230 causes the convex portion 234 of the cam 230 to pivot into a lower concave indentation 224 of the edge 220, thus preventing further raising of the upper portion of the armrest. Thus, the upper portion of the armrest can be selectively raised at discrete intervals. Similarly, the upper portion 210 of the armrest can be lowered by pivoting the arm 240 and the cam 230 approximately ninety degrees, displacing the convex portion 234 out of the concave indentation 224 of the edge, and lowering (e.g. by gravity) the upper portion 210 of the armrest until a convex portion 226 of the edge 220 enters the concave portion 236 of the cam 230. Releasing the arm 240 and cam 230 causes the convex portion 234 of the cam 230 to pivot into a higher concave indentation 224 of the edge 220, thus preventing further lowering of the upper portion of the armrest. Thus, the upper portion of the arm rest can be selectively lowered at discrete intervals, and without risk of the upper portion of the armrest free falling and pinching or impacting a caregiver or patient. It will be appreciated that the edge can be formed on or carried by the base portion, and the cam be carried by the upper portion of the armrest.

Figure 14A:
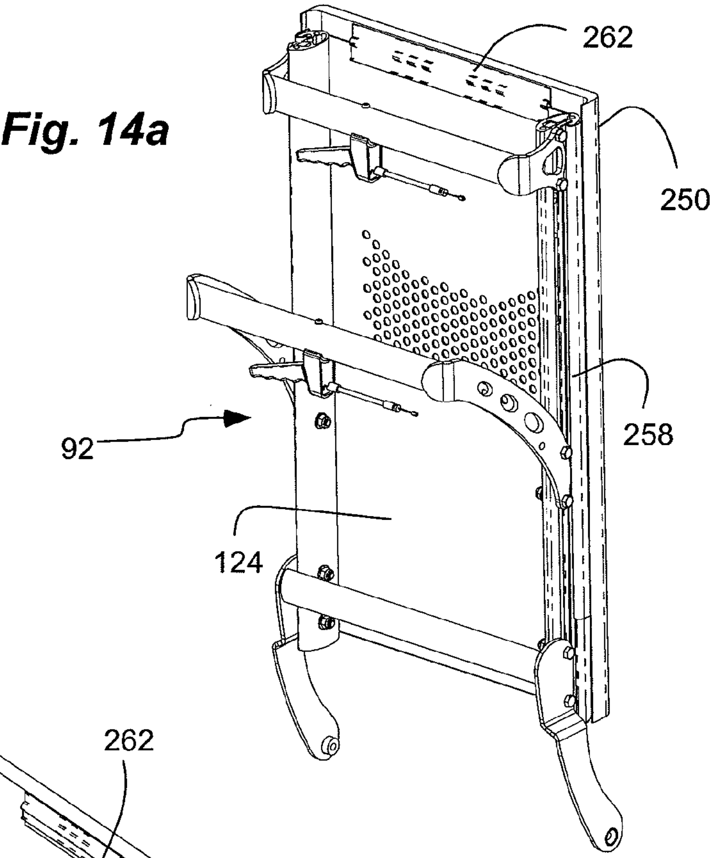
FIG. 14*a* is a rear perspective view of a backrest of the chair of FIG. 1*a;*
Figure 14B:
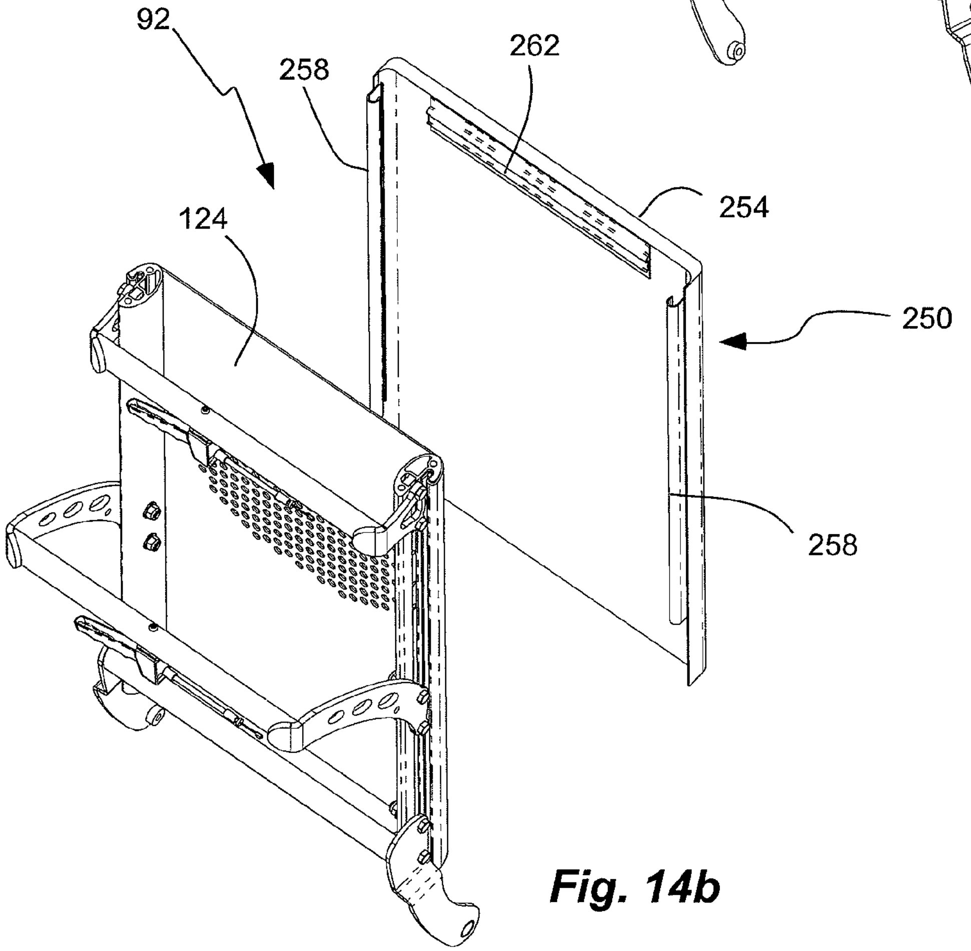
FIG. 14*b* is a rear perspective exploded view of the backrest of the chair of FIG. 1*a*.
Figure 14C:
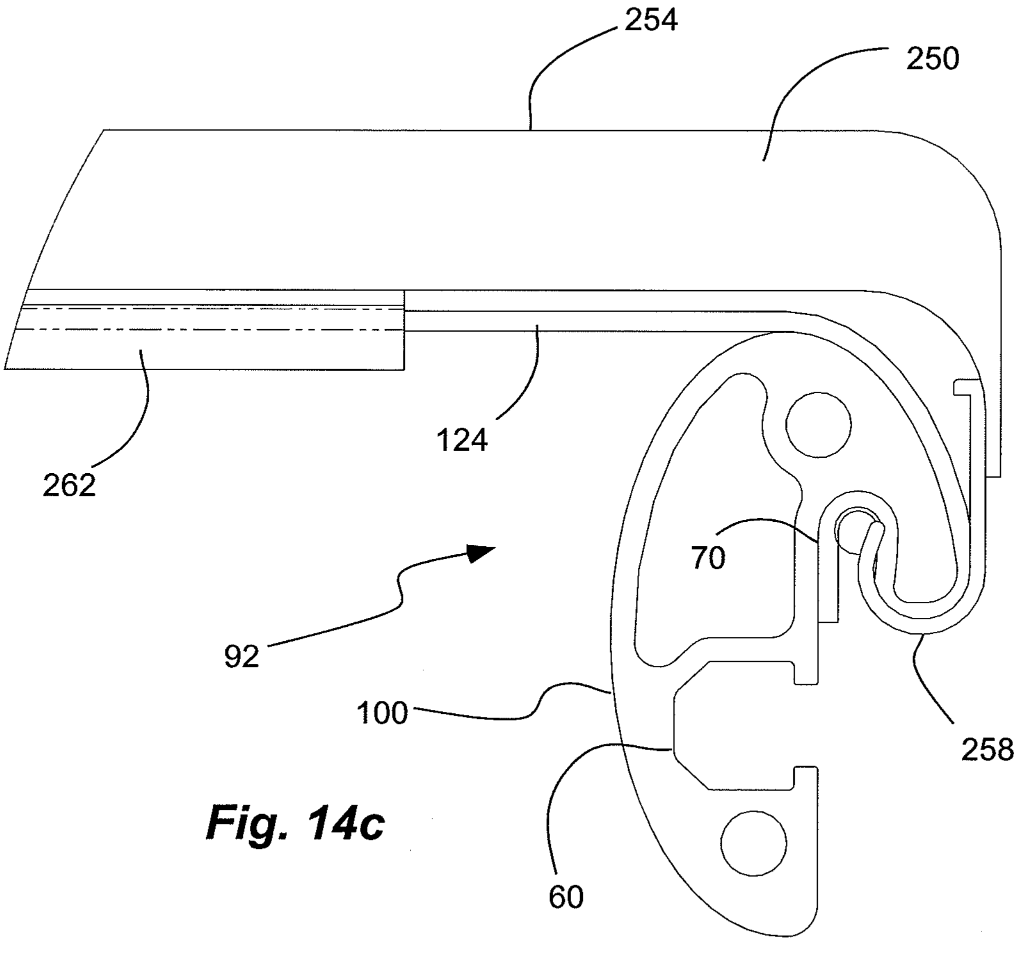
FIG. 14*c* is a partial top view of the backrest of the chair of FIG. 1*a*.

As indicated above, the seat and/or the backrest can include a pad disposed on or over the sheet of flexible and resilient plastic. The pad can include foam or the like enclosed in a cover. Referring to FIGS. 14*a*-*c*, a backrest pad 250 can be removably attached to the backrest 92. The backrest pad 250 can include a padding material, such as foam, enclosed or enveloped in a cover 254. In addition, the lateral sides of the pad 250 can have an elongated flexible and resilient hook 258 with a J-shaped cross-section with one end of the cross-section coupled to the pad and/or the cover and the other end extending into the channel 70. The J-shaped cross-section of the hook 258 can hook over the backrest rail 100. The hook can be formed by a PCV extrusion that results in a very low coefficient of friction against the TPU sheet. The hook can be clear, or transparent or translucent. The backrest pad 250 can also have a top hook or channel 262 that receives the top of the sheet of flexible and resilient plastic 124. Similarly, the seat can have a seat pad that is similar in structure to the backrest pad.

Referring to FIGS. 1*a*-11*b*, various configurations and/or positions of the chair are shown, including: a mobility configuration with the seat upright or horizontal and the backrest in a full depth or full back position (FIG. 1*c*); the mobility configuration with the seat upright or horizontal and the backrest in a full forward position or minimum depth position (FIG. 5*b*); the mobility configuration with the seat in a fully tilted position (FIG. 6*b*); a positioning configuration with the seat fully upright or horizontal and the backrest in a fully reclined position (footrest removed in this view)(FIG. 10*b*); the positioning configuration with the seat in the fully tilted position and the backrest in the fully reclined position (footrest removed in this view)(FIG. 11*b*); and the positioning configuration with the seat and backrest upright and in a fully elevated position, and with the footrest (FIG. 9*b*). In addition, the chair is shown in the mobility configuration in FIG. 1*a*, and the positioning configuration in FIG. 9*a*. In the mobility configuration (FIG. 1*a*), the chair has the seat with an elevational range of between 13 to 17 inches using the first shorter caster posts; a tiltable seat (and backrest with the seat); and a backrest pivotal or fixed with respect to the seat. In the positioning configuration (FIG. 9*a*), the chair has a seat with an elevational range of between 18 to 21 inches; a tiltable seat (and backrest with the seat); a backrest reclineable with respect to the seat; and accessories, such as the footrest. In both the mobility and the positioning configuration the backrest is selectively positionable with respect to the seat to vary the depth of the seat between 15 to 21 inches using the seat rails. In both the mobility and the positioning configuration, the seat and/or backrest has the flexible and resilient sheet or plastic or TPU held taut laterally between seat and/or backrest rails.

In accordance with another aspect of the present invention, the chair 10 can be configured for transportation, with the patient or resident seated therein, in a vehicle. Thus, the chair 10 can include one or more vehicle tie downs. For example, a pair of tie downs can be secured to a back end of the seat rails 50. The same bolts securing the rear seat cross-bar 58 to the seat rails can be used to also secure the tie downs. As another example, a pair of tie downs can be attached to the base frame 18 or pair of side arms 30 thereof. One or more seat belts or seat belt receptacles can be coupled to the chair or seat as well.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A mobility or positioning chair device or both for patients or residents, the chair device comprising:

a) a wheel base with a base frame intercoupling a plurality of casters;

b) a seat coupled to the base frame and having a seat frame with a pair of seat rails including left and right side seat rails extending longitudinally on respective left and right sides of the seat and coupled to one another in a spaced-apart relationship by at least one seat cross-bar, the seat rails having longitudinally oriented elongated channels;

c) a sheet of flexible and resilient plastic carried by the seat frame and held taut between the pair of seat rails with lateral ends of the sheet of plastic retained in the channels of the pair of seat rails, the sheet of plastic extending a longitudinal depth of the seat from a forward end of the pair of seat rails to a rearward end of the pair of seat rails;

d) a backrest coupled to the seat and having a backrest frame with a pair of backrest rails including left and right side backrest rails on respective sides of the backrest and coupled to one another in a spaced-apart relationship by at least one backrest cross-bar, the backrest rails having longitudinally oriented elongated channels; and e) a sheet of flexible and resilient plastic carried by the backrest frame and held taut between the pair of backrest rails with lateral ends of the sheet of plastic retained in the channels of the pair of backrest rails, the sheet of plastic extending a height of the backrest from a lower end of the pair of backrest rails to an upper end of the pair of backrest rails.

2. A device in accordance with claim 1, wherein the seat is pivotally coupled to the base frame at a pivot coupling located closer to a front of the seat and a front of the wheel base so that the seat and backrest tilt together with respect to the base frame with the seat between substantially horizontally and 30 degrees from horizontal; and the base frame is vertically moveable with respect to the casters, and the seat and backrest vertically are moveable with the base frame between a plurality of elevational heights ranging from 13 to 21 inches of the seating surface.

3. A device in accordance with claim 1, wherein the seat rails and the backrest rails both have T-slots foamed by longitudinally oriented elongated grooves with enlarged cavities and reduced openings into the cavities.

4. A device in accordance with claim 3, wherein the device further comprises at least two configurations, including:

a) a mobility configuration in which the seating surface is selectively vertically positionable between an elevation of 13 to 17 inches, and in which the backrest is fixed with respect to the seat, and including:

i) a first plurality of shorter caster posts extending vertically from the plurality of casters, with a pair of side arms of the base frame selectively coupled to the first plurality of shorter caster posts along a vertical range to selectively elevate the base frame with respect to the plurality of casters;

ii) a pair of brackets coupled between the seat and the backrest and attaching the backrest frame to the seat frame, the pair of brackets coupled to the T-slots of the backrest rails and the seat rails, the pair of brackets selectively locatable in the seat rails to selectively locate the backrest with respect to the seat and selectively set a depth of the seat between 15 and 21 inches from a forward end of the seat;

b) a positioning configuration in which the seating surface is selectively vertically positionable between an elevation of 18-21 inches, and in which the backrest tilts with respect to the seat, and including:

i) a second plurality of taller caster posts interchangeable with the first plurality of shorter caster posts with the base frame selectively coupled to the second plurality of taller caster posts;

ii) a pair of additional side braces including a left side brace and a right side brace extending longitudinally between the front and back wheels on respective left and right sides bellow the pair of side arms;

ii) a recline mechanism coupled between the backrest and the seat, the recline mechanism selectively reclining the backrest with respect to the seat; and iii) a leg rest pivotally coupled to the seat.

5. A device in accordance with claim 3, wherein the seat further comprises:

a forward seat cross-bar coupled to the T-slots of the pair of seat rails;

a rear seat cross-bar coupled to open back ends of the pair of seat rails; and a center spar coupled extending longitudinally between the forward and rear seat cross-bars, and having an upwardly facing concave indentation and a forward end coupled to the base frame of the wheel base by the pivot coupling; and wherein the base frame of the wheel base further comprises:

a center hub extending to a forward end at the pivot coupling.

6. A device in accordance with claim 5, wherein the seat frame is coupled to the base frame of the wheel base by a four-bar linkage comprising:

the center hub of the base frame of the wheel base forming a base link;

the center spar of the seat frame pivotally coupled to the center hub and forming a link; and a pair of links pivotally coupled in series between the center hub and the center spar; and further comprising:

a gas spring coupled between at least two of the links.

7. A device in accordance with claim 5, wherein the center hub has a gap; and wherein the gas spring is disposed in the gap of the center hub.

8. A device in accordance with claim 3, wherein the T-slots of the pair of seat rails face laterally outwardly; and wherein the channels of the pair of seat rails face downwardly.

9. A device in accordance with claim 3, wherein the pair of seat rails each has a cross-sectional profile of three-quarters of an ellipse with a downward and outward facing quadrant thereof indented with respect to the ellipse and having therein the T-slot and the channel.

10. A device in accordance with claim 3, further comprising:

a pair of brackets coupled between the seat and the backrest and attaching the backrest frame to the seat frame, the pair of brackets coupled to the T-slots of the backrest rails and the seat rails, the pair of brackets selectively locatable in the T-slots of the seat rails to selectively locate the backrest with respect to the seat and selectively set a depth of the seat.

11. A device in accordance with claim 3, wherein the backrest reclines with respect to the seat and the backrest frame is pivotally coupled to the seat frame, and further comprising:

a recline mechanism coupled between the backrest and the seat.

12. A device in accordance with claim 1, wherein the backrest is reclineable with respect to the seat; and wherein reclining of the backrest with respect to the seat is independent of the elevational height of the seat and frame base with respect to the casters.

13. A device in accordance with claim 1, wherein the seat or the backrest further comprises:

a pad disposed on the sheet of plastic; and each side of the pad having an elongated flexible and resilient hook with a J-shaped cross-section with one end of the cross-section coupled to the pad and the other end of the cross-section extending into the channel.

14. A device in accordance with claim 1, wherein the seat has an open front end between forward ends of the pair of seat rails free of rigid structure with a forward end of the sheet of plastic deflectable downwardly.

15. A device in accordance with claim 1, wherein the sheet of plastic of the seat and backrest includes a thermoplastic polyurethane (TPU) material.

16. A device in accordance with claim 1, wherein the sheet of plastic of the seat or backrest is at least translucent.

17. A device in accordance with claim 1, further comprising:

a pair of armrests including left and right arm rests coupled to the respective left and right side seat rails;

the pair of armrests each having an upper portion vertically adjustable with respect to a base portion at discrete intervals, including:

an edge with a wavy profile including a plurality of alternating concave indentations and convex protrusions associated with one of the upper portion or the base portion; and a cam associated with the other of the upper portion or the base portion and disposed adjacent the edge, the cam being pivotal and having a convex portion engaging the concave indentation of the edge, and a concave portion engaging the convex protrusion of the edge;

the cam being pivotal to displace the edge with the convex portion of the cam pivoting in the concave indentation of the edge, and the concave portion of the cam engaging the convex protrusion of the edge to displace the edge as the cam pivots.

18. A combined mobility and positioning chair device for periods of extended sitting and self-propelled independent mobility for patients or residents, the chair device comprising:

a) a wheel base with a base frame intercoupling a plurality of casters;

b) a first plurality of shorter caster posts with the base frame selectively coupled to the first plurality of shorter caster posts to elevate a seating surface within an elevational height range from 13 to 17 inches;

c) a second plurality of taller caster posts interchangeable with the first plurality of shorter caster posts with the base frame selectively coupled to the second plurality of taller caster posts to elevate the seating surface within an elevational height range from 18 to 21 inches;

d) a seat coupled to the base frame and having a seat frame with a pair of seat rails including left and right side seat rails extending longitudinally on respective left and right sides of the seat and coupled to one another in a spaced-apart relationship by at least one seat cross-bar, the seat rails having T-slots formed by longitudinally oriented elongated grooves with enlarged cavities and reduced openings into the cavities, the seat having the seating surface;

e) a backrest coupled to the seat utilizing the T-slots of the pair of seat rails of the seat frame and having a backrest frame with a pair of backrest rails including left and right side backrest rails on respective sides of the backrest and coupled to one another in a spaced-apart relationship by at least one backrest cross-bar, the backrest rails having T-slots formed by longitudinally oriented elongated grooves with enlarged cavities and reduced openings into the cavities;

f) a pair of brackets coupled between the seat and the backrest and attaching the backrest frame to the seat frame, the pair of brackets coupled to the T-slots of the backrest rails and the seat rails, the pair of brackets selectively locatable in the T-slots of the seat rails to selectively locate the backrest with respect to the seat and selectively set a depth of the seat;

g) the seat pivotally coupled to the base frame at a pivot coupling located closer to a front of the seat and a front of the wheel base so that the seat and backrest tilt together with respect to the base frame; and h) a leg rest selectively coupleable to the seat.

19. A device in accordance with claim 18, further comprising:

a) a sheet of flexible and resilient plastic carried by the seat frame and held taut between the pair of seat rails with lateral ends of the sheet of plastic retained in channels of the pair of seat rails, the sheet of plastic extending a longitudinal depth of the seat from a forward end of the pair of seat rails to a rearward end of the pair of seat rails; and b) a sheet of flexible and resilient plastic carried by the backrest frame and held taut between the pair of backrest rails with lateral ends of the sheet of plastic retained in channels of the pair of backrest rails, the sheet of plastic extending a height of the backrest from a lower end of the pair of backrest rails to a upper end of the pair of backrest rails.

20. A mobility or positioning chair device or both for patients or residents, the chair device comprising:

a) a wheel base with a base frame intercoupling a plurality of casters;
b) a seat coupled to the base frame and having a seat frame with a pair of seat rails including left and right side seat rails extending longitudinally on respective left and right sides of the seat and coupled to one another in a spaced-apart relationship by at least one seat cross-bar, the seat rails having T-slots formed by longitudinally oriented elongated grooves with enlarged cavities and reduced openings into the cavities; and
c) a backrest coupled to the seat utilizing the T-slots of the pair of seat rails of the seat frame and having a backrest frame with a pair of backrest rails including left and right side backrest rails on respective sides of the backrest and coupled to one another in a spaced-apart relationship by at least one backrest cross-bar, the backrest rails having T-slots formed by longitudinally oriented elongated grooves with enlarged cavities and reduced openings into the cavities.

21. A device in accordance with claim 20, further comprising:

a) a sheet of flexible and resilient plastic carried by the seat frame and held taut between the pair of seat rails with lateral ends of the sheet of plastic retained in channels of the pair of seat rails, the sheet of plastic extending a longitudinal depth of the seat from a forward end of the pair of seat rails to a rearward end of the pair of seat rails; and
b) a sheet of flexible and resilient plastic carried by the backrest frame and held taut between the pair of backrest rails with lateral ends of the sheet of plastic retained in channels of the pair of backrest rails, the sheet of plastic extending a height of the backrest from a lower end of the pair of backrest rails to a upper end of the pair of backrest rails.

* * * * *